(12) United States Patent
Yachida

(10) Patent No.: US 12,387,344 B2
(45) Date of Patent: Aug. 12, 2025

(54) OBJECT TRACKING APPARATUS, OBJECT TRACKING METHOD, AND PROGRAM

(71) Applicant: NEC Corporation, Tokyo (JP)

(72) Inventor: Shoji Yachida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/840,772

(22) Filed: Jun. 15, 2022

(65) Prior Publication Data

US 2022/0309682 A1 Sep. 29, 2022

Related U.S. Application Data

(63) Continuation of application No. 17/284,590, filed as application No. PCT/JP2018/038845 on Oct. 18, 2018, now abandoned.

(51) Int. Cl.
*G06T 7/20* (2017.01)
*H04N 23/69* (2023.01)
*H04N 23/695* (2023.01)

(52) U.S. Cl.
CPC ............... *G06T 7/20* (2013.01); *H04N 23/69* (2023.01); *H04N 23/695* (2023.01); *G06T 2207/20101* (2013.01)

(58) Field of Classification Search
None
See application file for complete search history.

(56) References Cited

U.S. PATENT DOCUMENTS

| | | | |
|---|---|---|---|
| 6,323,898 B1 | 11/2001 | Koyanagi et al. | |
| 6,687,386 B1 | 2/2004 | Ito et al. | |
| 6,809,760 B1 | 10/2004 | Takagi et al. | |
| 2010/0002083 A1 | 1/2010 | Takenaka | G06T 7/254 348/169 |
| 2010/0260379 A1* | 10/2010 | Yokohata | G06T 7/248 382/103 |
| 2013/0314547 A1* | 11/2013 | Watanabe | H04N 23/695 348/169 |

(Continued)

FOREIGN PATENT DOCUMENTS

| | | |
|---|---|---|
| JP | H09-186927 A | 7/1997 |
| JP | 2000-069346 A | 3/2000 |

(Continued)

OTHER PUBLICATIONS

JP Office Action for JP Application No. 2022-135632, mailed on Apr. 25, 2023 with English Translation.

(Continued)

*Primary Examiner* — James M Anderson, II

(57) ABSTRACT

An object tracking apparatus (10) includes a target determination information acquisition unit (110), an image processing unit (120), and a control unit (130). The target determination information acquisition unit (110) acquires target determination information determining an object to be tracked. The image processing unit (120) detects the object to be tracked and tracks the detected object by performing image processing on a to-be-processed region being a partial region of an image acquired from an imaging apparatus (20). The control unit (130) controls an imaging range of the imaging apparatus (20) in such a way that the object to be tracked is included in the to-be-processed region.

20 Claims, 17 Drawing Sheets

(56) References Cited

U.S. PATENT DOCUMENTS

| | | | |
|---|---|---|---|
| 2015/0334356 A1* | 11/2015 | Kim | H04N 23/611 |
| | | | 348/143 |
| 2016/0336041 A1 | 11/2016 | Mukai et al. | |
| 2017/0116749 A1* | 4/2017 | Kuroda | G06T 7/20 |

FOREIGN PATENT DOCUMENTS

| | | | |
|---|---|---|---|
| JP | 2000-177513 A | | 6/2000 |
| JP | 2001-050263 A | | 3/2001 |
| JP | 2001-086407 | | 3/2001 |
| JP | 2005236508 A | * | 9/2005 |
| JP | 2005-346425 A | | 12/2005 |
| JP | 2006-033188 A | | 2/2006 |
| JP | 2006-229321 A | | 8/2006 |
| JP | 2007-274543 A | | 10/2007 |
| JP | 2008-079216 A | | 4/2008 |
| JP | 2011-004152 | | 1/2011 |
| JP | 2012-080222 A | | 4/2012 |
| JP | 2013-223220 A | | 10/2013 |
| JP | 2013-247508 A | | 12/2013 |
| JP | 2014-225854 A | | 12/2014 |
| JP | 2016-092606 A | | 5/2016 |
| JP | 2017-151815 A | | 8/2017 |
| WO | 2016/002228 A1 | | 1/2016 |

OTHER PUBLICATIONS

International Serach Report for PCT Application No. PCT/JP2018/038645, mailed on Dec. 18, 2018.

Haga, Tetsuji "Automatic Intruder Detection And Tracking System With Pan-Tilt-Zoom Camera", IEICE Technical Report, Sep. 16, 1999, vol. 99, No. 305, pp. 23-30.

US Office Action for U.S. Appl. No. 17/284,590, mailed on Jun. 29, 2023.

Japanese Office Action for JP Application No. 2022-135632 mailed on Dec. 17, 2024 with English Translation.

Japanese Office Action for JP Application No. 2023-215530 mailed on Nov. 26, 2024 with English Translation.

* cited by examiner

OBJECT TRACKING APPARATUS, OBJECT TRACKING METHOD, AND PROGRAM

CROSS-REFERENCE TO RELATED APPLICATIONS

The present application is a continuation application of U.S. patent application Ser. No. 17/284,590 filed on Apr. 12, 2021, which is a National Stage Entry of international application PCT/JP2018/038845 filed on Oct. 18, 2018, the disclosures of all of which are incorporated in their entirety by reference herein.

TECHNICAL FIELD

The present invention relates to a technique for detecting and tracking a particular object by using an image.

BACKGROUND ART

One example of a technique for tracking a particular object in an image is disclosed in, for example, PTLs 1 to 3 below. PTL 1 below discloses a technique for, when a part of a region including a subject to be tracked is cut out to make a cut-out video, manually (user operation) or automatically tracking the subject. Further, PTL 2 below discloses a technique for processing an entire region of an image taken by an imaging apparatus attached to an excavator to determine a partial region having high possibility of presence of a person, and further processing the partial region to determine whether a person is present in the region. Further, PTL 3 below discloses a technique for detecting a moving body from an image generated by an imaging unit that can change an imaging direction through a pan operation and a tilt operation, and performing pan operation and tilt control in such a way that the moving body is positioned near a center of the image.

CITATION LIST

Patent Literature

[PTL 1] International Publication No. WO 2016/002228
[PTL 2] Japanese Patent Application Publication No. 2017-151815
[PTL 3] Japanese Patent Application Publication No. 2016-092606

SUMMARY OF INVENTION

Technical Problem

A high-performance imaging apparatus can generate an image with a very high resolution such as 4K or 8K. A high-resolution image requires a large capacity of data. Thus, in a case of processing the high-resolution image, a large volume of resources is required for a machine performing image processing.

The present invention has been made in view of the above-described problem. One object of the present invention is to provide a technique for reducing a resource needed when object tracking is performed by using a high-resolution image.

Solution to Problem

An object tracking apparatus according to the present invention includes:
a target determination information acquisition unit that acquires target determination information determining an object to be tracked;
an image processing unit that detects the object to be tracked and tracks the detected object by performing image processing on a to-be-processed region being a partial region of an image acquired from an imaging apparatus; and a control unit that controls an imaging range of the imaging apparatus in such a way that the object to be tracked is included in the to-be-processed region.

An object tracking method execute by a computer according to the present invention includes:
acquiring target determination information determining an object to be tracked;
detecting the object to be tracked and tracking the detected object by performing image processing on a to-be-processed region being a partial region of an image acquired from an imaging apparatus; and
controlling an imaging range of the imaging apparatus in such a way that the object to be tracked is included in the to-be-processed region.

A program according to the present invention causes a computer to execute the above-described object tracking method.

Advantageous Effects of Invention

According to the present invention, a resource needed when object tracking is performed by using a high-resolution image can be reduced.

BRIEF DESCRIPTION OF DRAWINGS

The above-described object and other objects, features, and advantageous effects become more apparent from the preferred example embodiments described below and the following accompanying drawings.

EXAMPLE EMBODIMENT

Hereinafter, example embodiments of the present invention will be described by using the drawings. Note that, a similar component is assigned with a similar reference sign throughout all the drawings, and description therefor will not be repeated as appropriate. Further, in each block diagram, each block represents not a configuration on a hardware basis but a configuration on a function basis, except as particularly described.

SUMMARY OF INVENTION

Figure 1:
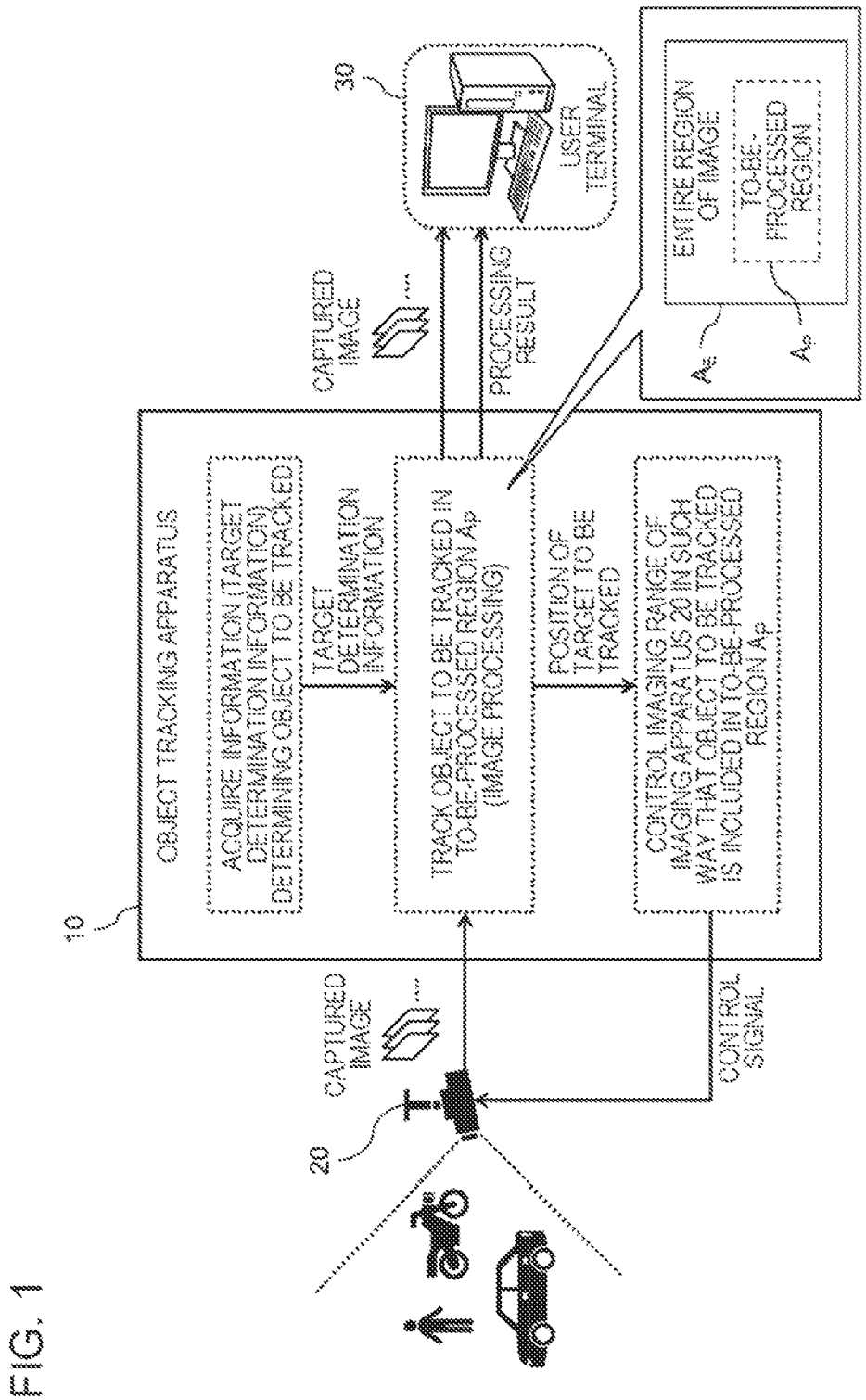
FIG. 1 is a diagram for describing a summary of processing executed by an object tracking apparatus according to the present invention.

A summary of the present invention will be described by using FIG. 1. FIG. 1 is a diagram for describing a summary of processing executed by an object tracking apparatus 10 according to the present invention. In an example in FIG. 1, the object tracking apparatus 10 are communicably connected to an imaging apparatus 20 and a user terminal 30 via an unillustrated network. The imaging apparatus 20 is, for example, a surveillance camera or the like installed in a town or inside a building. The user terminal 30 is a terminal used by a person (hereinafter, also written as a "user") who performs confirmation work on an image generated by the imaging apparatus 20.

The object tracking apparatus 10 performs, in response to acquisition of information (hereinafter, also written as "target determination information") determining an object to be tracked, image processing of tracking, on an image acquired from the imaging apparatus 20, the object determined by the target determination information. The object tracking apparatus 10 tracks, by using a known object tracking algorithm, a particular object among a plurality of images (two or more consecutive frame images) acquired from the imaging apparatus 20.

Herein, as illustrated in FIG. 1, the object tracking apparatus 10 performs the image processing on not an entire region $A_E$ of the image acquired from the imaging apparatus 20 but a to-be-processed region $A_P$ being a partial region of the image. In other words, the object tracking apparatus 10 detects and tracks the object to be tracked by analyzing the to-be-processed region $A_P$ being a part of the image acquired from the imaging apparatus 20. Then, a result of the image processing is output on a display of the user terminal 30 together with the image acquired from the imaging apparatus 20.

Note that, when the object to be tracked moves to outside the to-be-processed region $A_P$, the object tracking apparatus 10 is no longer able to track the object. In view of this, the object tracking apparatus 10 controls an imaging range of the imaging apparatus 20 in such a way that the object determined by the target determination information is included in the to-be-processed region $A_P$, by using a position (a position on an image coordinate system) of the object to be tracked. Note that, the object tracking apparatus 10 can change the imaging range of the imaging apparatus 20 by controlling, by using a control signal, an operation of a mechanism (not illustrated) controlling a zoom factor of the imaging apparatus 20, a direction of the imaging apparatus 20, or a position of the imaging apparatus 20.

Advantageous Effect

As described above, according to the present invention, upon acquisition of information (target determination information) determining an object to be tracked, image processing of tracking the object determined by the target determination information is executed. The image processing is executed on the to-be-processed region $A_P$ being a part of an image acquired from the imaging apparatus 20. Limiting a region subjected to the image processing to a part of a region of the image can reduce a computational cost involved in the image processing. Then, reducing the computational cost enables processing on a high-resolution image with less delay (or with no delay), even when a computer for the image processing has low performance.

However, when a region subjected to the image processing is limited, there arises a problem that an object trackable range in an image is decreased. In view of this, according to the present invention, a zoom factor, a direction, a position, or the like of the imaging apparatus 20 is controlled in such a way that the object to be tracked is included in the to-be-processed region $A_P$. Accordingly, the object trackable range is substantially expanded. In other words, the present invention can have an advantageous effect of reducing the computational cost involved in the image processing while reducing influence on the object trackable range.

First Example Embodiment

Function Configuration Example

Figure 2:
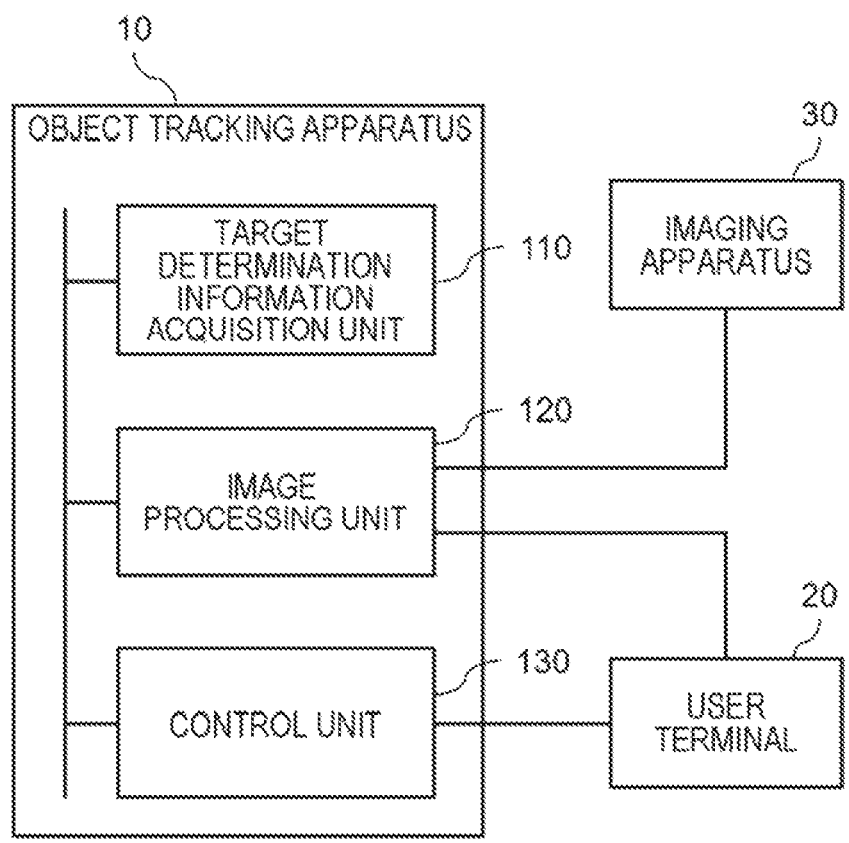
FIG. 2 is a diagram illustrating a function configuration example of an object tracking apparatus according to a first example embodiment.

FIG. 2 is a diagram illustrating a function configuration example of an object tracking apparatus 10 according to a first example embodiment. As illustrated in FIG. 2, the object tracking apparatus 10 includes a target determination information acquisition unit 110, an image processing unit 120, and a control unit 130.

The target determination information acquisition unit 110 acquires target determination information. The "target determination information" is information for determining an object to be tracked included in an image (information for uniquely identifying an object to be tracked included in an image) acquired from an imaging apparatus 20. The target determination information is information extractable from an image, including a feature value indicating a feature specific to the object to be tracked (for example, a color, a shape, or the like specific to the object). Further, the target determination information may be information indicating an image region from which the feature value is extracted (for example, information specifying a position or a region on an image).

The image processing unit 120 executes, on a to-be-processed region $A_P$, image processing of detecting an object to be tracked determined by the target determination information and tracking the detected object. In other words, the image processing unit 120 does not execute the image processing for detecting and tracking the object to be tracked on a region other than the to-be-processed region $A_P$. Thus, even when some object is included in the image acquired from the imaging apparatus 20, the object is not detected and tracked by the image processing unit 120 when the object is positioned in a region outside the to-be-processed region $A_P$.

<<Regarding to-be-Processed Region $A_{P>>}$

Herein, the to-be-processed region $A_P$ is a partial region of an image, as illustrated in FIG. 1. The to-be-processed region $A_P$ preferably includes a central portion of the image (a region near a center of the image). Note that, a shape of the to-be-processed region $A_P$ is not particularly limited. The to-be-processed region $A_P$ may have a shape including not only a rectangle as illustrated in the drawings herein, but also another polygon, or a circle (ellipse).

As one example, the shape of the to-be-processed region $A_P$ can be set to any shape. For example, the object tracking apparatus 10 may accept, via a user terminal 30, a specification input for specifying a region subjected to processing or a region not subjected to processing, and may define the to-be-processed region $A_P$, based on the input. In this case, position coordinates of the to-be-processed region $A_P$ computed based on the specification input are stored (set) in a memory or the like.

As another example, a size of the to-be-processed region $A_P$ may be determined in advance. Specifically, the to-be-processed region $A_P$ may be determined to a size (for example, a size equivalent to a video graphics array (VGA) (about 300 thousand pixels), or the like) capable of ensuring a sufficient processing speed. In this case, position coordinates of the to-be-processed region $A_P$ are stored (set) as a fixed value in the memory or the like.

According to the present invention, the to-be-processed region $A_P$ is set for one purpose of reducing a computational cost in the image processing. Thus, when a sufficient resource is left in an apparatus performing the image processing, there is little influence on a processing speed experienced by a user even when the to-be-processed region $A_P$ becomes large to some extent. In view of this, the size of the to-be-processed region $A_P$ may be determined based on a size of a resource allocatable to the image processing on the to-be-processed region $A_P$. Specifically, the object tracking apparatus 10 first acquires information on an own surplus resource, and determines, based on the information, a size of a resource allocatable to the image processing on the to-be-processed region $A_P$. Then, the object tracking apparatus 10 determines, based on the size of the allocatable resource, a size (position coordinates) of the to-be-processed region $A_P$, and stores (sets) the position coordinates in the memory or the like.

The control unit 130 controls an imaging range of the imaging apparatus 20 in such a way that the object to be tracked determined by the target determination information is included in the to-be-processed region $A_P$. The control unit 130 can control the imaging range of the imaging apparatus 20 in such a way that the object to be tracked is included in the to-be-processed region $A_P$, by acquiring a motion (a displacement of a detected position) of the object to be tracked by using a plurality of images, and operating a mechanism (not illustrated) controlling the imaging range of the imaging apparatus 20 in response to the motion.

Specific Example of Mechanism Controlling Imaging Range of Imaging Apparatus 20

Specific examples of the "mechanism controlling the imaging range of the imaging apparatus 20" include a mechanism controlling a zoom of the imaging apparatus 20, an electric pan/tilt head controlling a direction of the imaging apparatus 20, an electric slider controlling a capturing position of the imaging apparatus 20, and the like.

Specific Example of Control Performed by Control Unit 130

The control unit 130 controls an imaging range of the imaging apparatus 20 by operating the mechanism controlling the imaging range of the imaging apparatus 20 as described above. As one example, the control unit 130 can change the imaging range of the imaging apparatus 20 by operating a mechanism controlling a zoom of the imaging apparatus 20 in response to a motion of an object to be tracked on an image. As another example, when the imaging apparatus 20 is mounted on an unillustrated electric pan/tilt head (a mechanism controlling a direction of the imaging apparatus 20), the control unit 130 can change the imaging range of the imaging apparatus 20 by operating the electric pan/tilt head in response to a motion of the object to be tracked on the image. As further another example, when the imaging apparatus 20 is mounted on an unillustrated electric slider (a mechanism controlling a position of the imaging apparatus 20), the control unit 130 can change the imaging range of the imaging apparatus 20 by operating the electric slider in response to a motion of the object to be tracked on the image. Further, the control unit 130 may control the imaging range of the imaging apparatus 20 by combining operations on a plurality of mechanisms described above.

Figure 3:
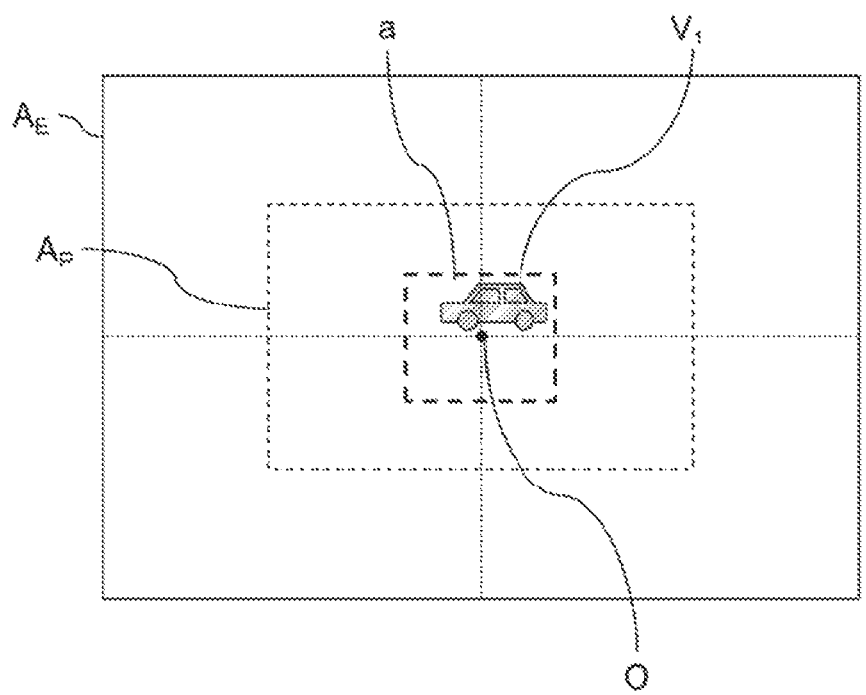
FIG. 3 is a diagram illustrating a relation between a to-be-processed region and a predetermined region.

Further, in terms of user's visibility, the control unit 130 is preferably configured to control the imaging range of the imaging apparatus 20 in such a way that the object to be tracked is positioned at a point (for example, a vicinity of a central portion of the image) easily viewed by a user. As one example, the control unit 130 controls the imaging range of the imaging apparatus 20 in such a way that the object to be tracked is included in a predetermined region (e.g., FIG. 3) including the central portion (center) of the image and being a part of the to-be-processed region $A_P$. FIG. 3 is a diagram illustrating a relation between the to-be-processed region $A_P$ and the predetermined region. In an example in FIG. 3, a predetermined region a is set in such a way as to be a part of the to-be-processed region $A_P$ and include a center O of an entire region $A_E$ of the image. Information indicating position coordinates of the predetermined region a is stored in the memory of the object tracking apparatus 10 concurrently with a time of setting the to-be-processed region $A_P$. The control unit 130 controls the imaging range of the imaging apparatus 20 in such a way that the object (in FIG. 3, a vehicle $V_1$) to be tracked is included in the predetermined region a. In the example in FIG. 3, the control unit 130 controls an operation of a mechanism adjusting a zoom factor, a direction, a position, or the like of the imaging apparatus 20 in such a way that the imaging range of the imaging apparatus 20 moves in an upper-right direction.

Hardware Configuration Example

The object tracking apparatus 10 may be achieved by hardware (example: a hard-wired electronic circuit, or the like) achieving each of the function configuration units, or may be achieved by a combination of hardware and software (example: a combination of an electronic circuit and a program controlling the electronic circuit, or the like). Hereinafter, a case will be further described in which the object tracking apparatus 10 is achieved by a combination of hardware and software.

Figure 4:
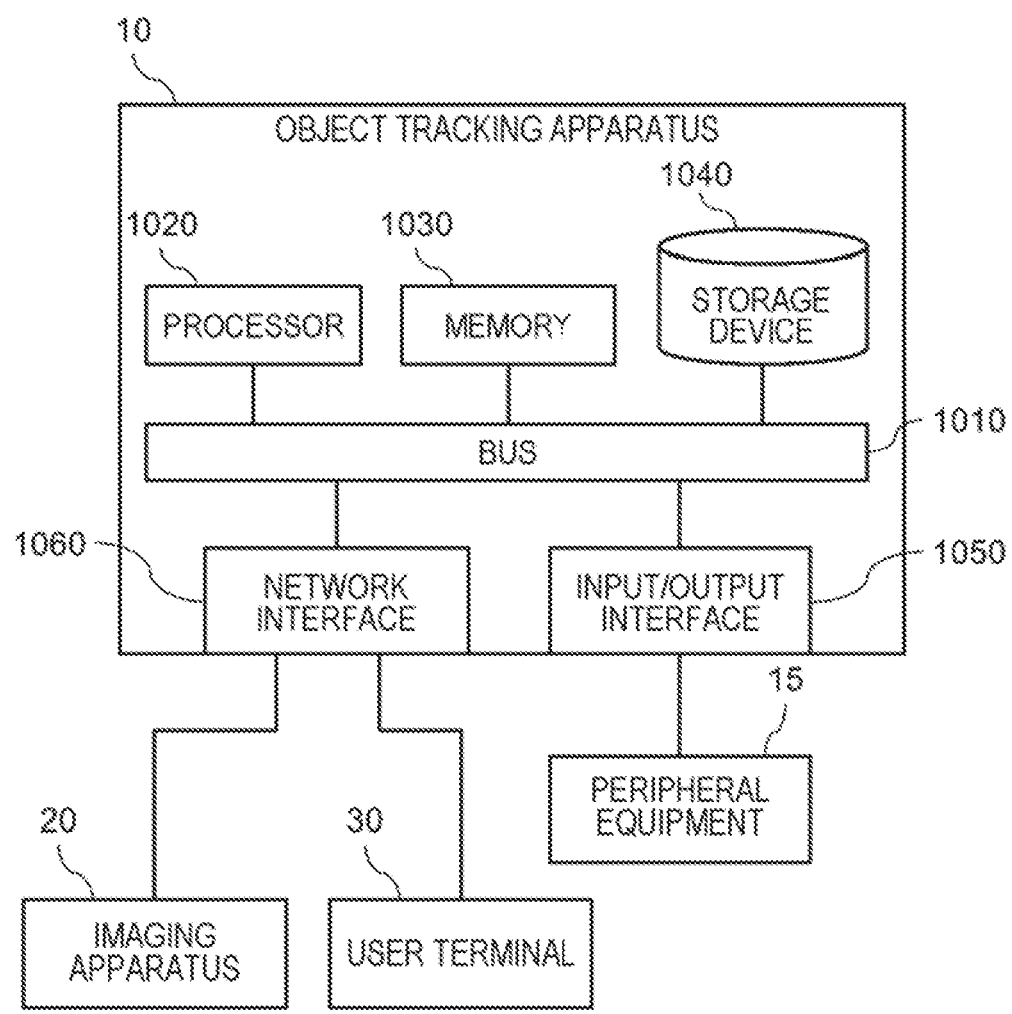
FIG. 4 is a block diagram illustrating a hardware configuration of the object tracking apparatus.

FIG. 4 is a block diagram illustrating a hardware configuration of the object tracking apparatus 10.

The object tracking apparatus 10 includes a bus 1010, a processor 1020, a memory 1030, a storage device 1040, an input/output interface 1050, and a network interface 1060.

The bus 1010 is a data transmission line through which the processor 1020, the memory 1030, the storage device 1040, the input/output interface 1050, and the network interface 1060 transmit and receive data to and from one another. However, a method of connecting the processor 1020 and the like to one another is not limited to bus connection.

The processor 1020 is a processor achieved by a central processing unit (CPU), a graphics processing unit (GPU), or the like.

The memory 1030 is a main storage achieved by a random access memory (RAM) or the like.

The storage device 1040 is an auxiliary storage achieved by a hard disk drive (HDD), a solid state drive (SSD), a memory card, a read only memory (ROM), or the like. The storage device 1040 stores a program module for achieving each of the functions (the target determination information acquisition unit 110, the image processing unit 120, the control unit 130, and the like) of the object tracking apparatus 10. The processor 1020 achieves a function associated with each program module, by reading each of the program modules into the memory 1030 and executing the program module.

The input/output interface 1050 is an interface for connecting the object tracking apparatus 10 to peripheral equipment 15. The peripheral equipment 15 includes, for example, input equipment such as a keyboard and a mouse, and output equipment such as a display (touch panel display) and a speaker. The object tracking apparatus 10 is connected to the peripheral equipment 15 via the input/output interface 1050.

The network interface 1060 is an interface for connecting the object tracking apparatus 10 to a network. The network is, for example, a local area network (LAN) or a wide area network (WAN). A method by which the network interface 1060 connects to the network may be wireless connection, or may be wired connection. The object tracking apparatus 10 is communicably connected to external apparatuses including the imaging apparatus 20 and the user terminal 30 via the network interface 1060. The imaging apparatus 20 is, for example, a camera on which a charge coupled device (CCD) image sensor or a complementary metal oxide semiconductor (CMOS) image sensor is mounted. The user terminal 30 is a terminal used by a person (user) who performs confirmation work on an image generated by the imaging apparatus 20. The user terminal 30 is a stationary personal computer (PC) or a portable terminal (such as a smartphone or a tablet terminal). The user terminal 30 is not particularly limited.

Note that, the hardware configuration illustrated in FIG. 4 is merely one example, and the hardware configuration of the object tracking apparatus 10 is not limited to the example in FIG. 4. For example, some or all of the function processing units of the object tracking apparatus 10 may be included in the imaging apparatus 20 (a so-called intelligent camera on which a CPU for performing image processing or peripheral equipment control is mounted) or the user terminal 30. Further, when all of the function processing units of the object tracking apparatus 10 are included in the imaging apparatus 20 or the user terminal 30, the object tracking apparatus 10 may be absent between the imaging apparatus 20 and the user terminal 30.

[Flow of Processing]

Figure 5:
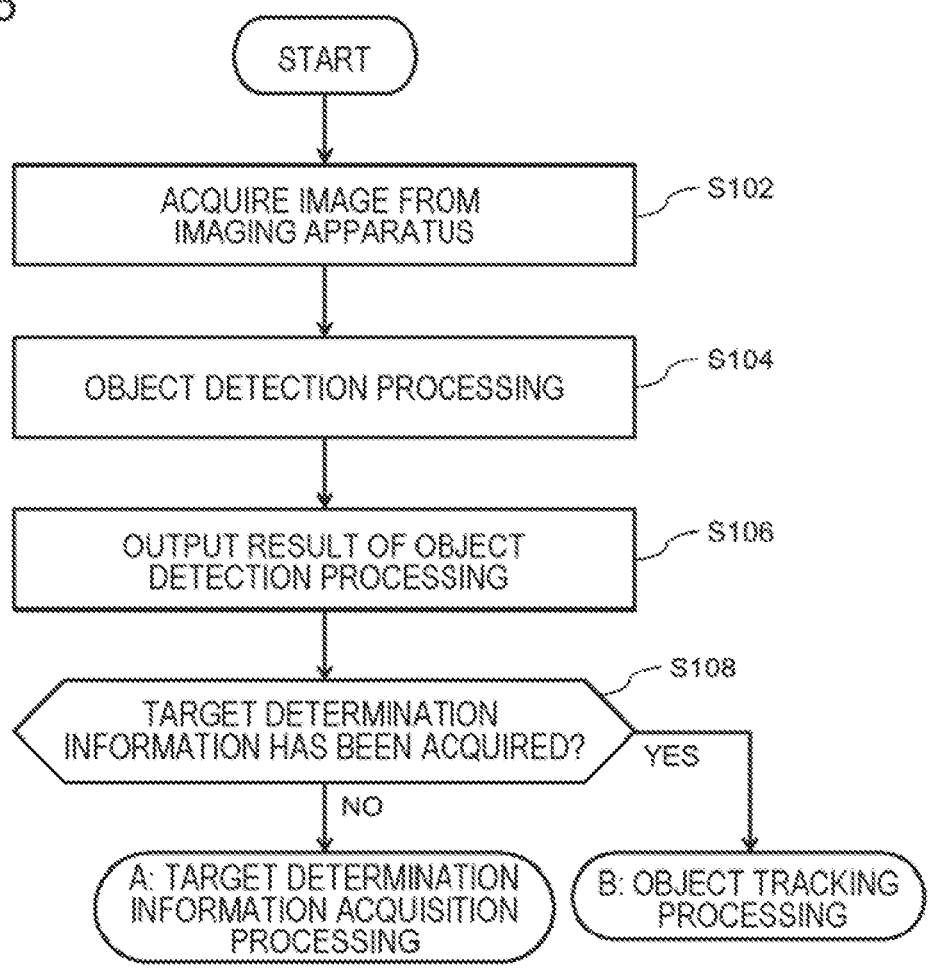
FIG. 5 is a flowchart illustrating a flow of processing executed by the object tracking apparatus according to the first example embodiment.
Figure 6:
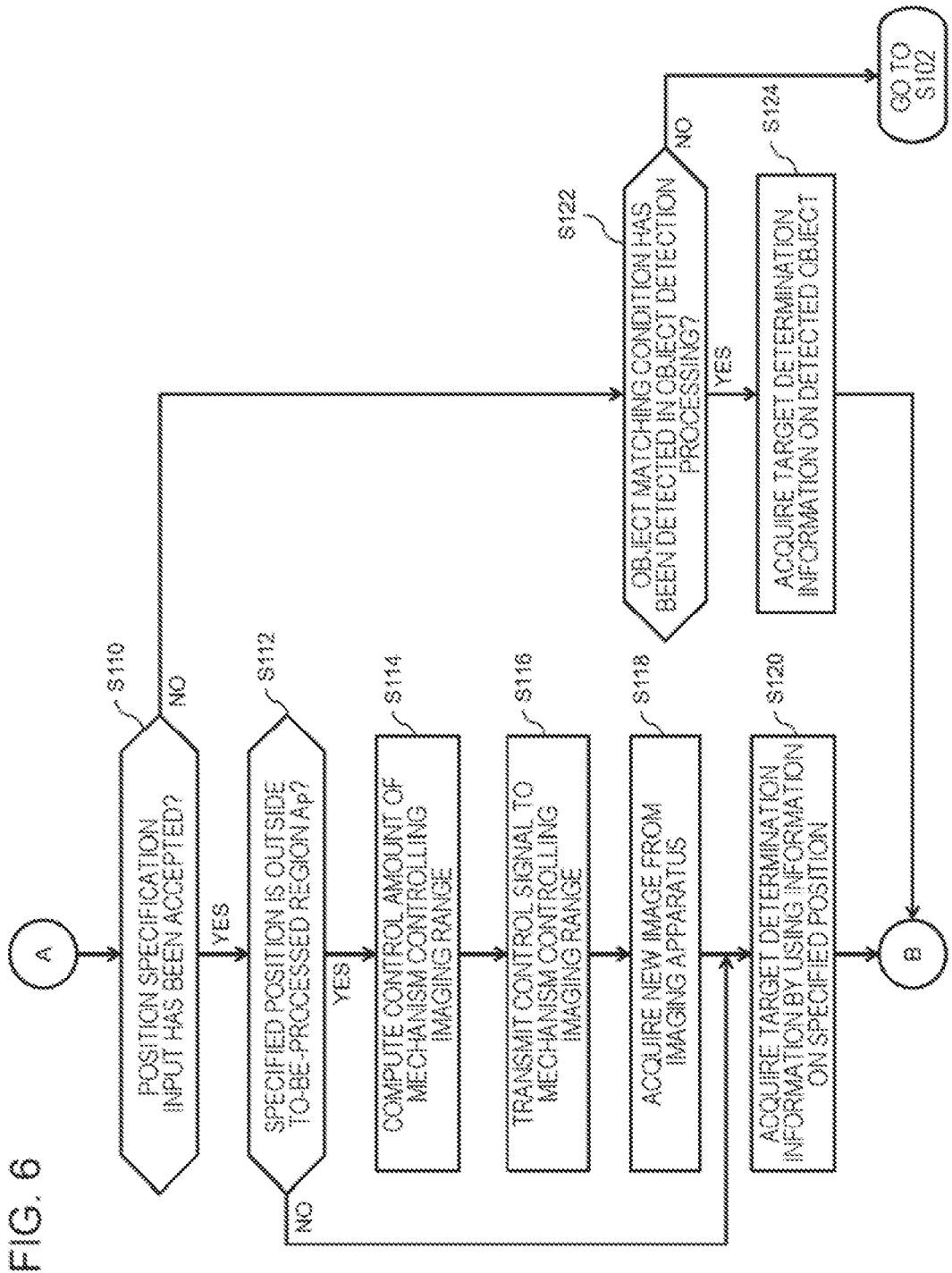
FIG. 6 is a flowchart illustrating a flow of processing executed by the object tracking apparatus according to the first example embodiment.
Figure 7:
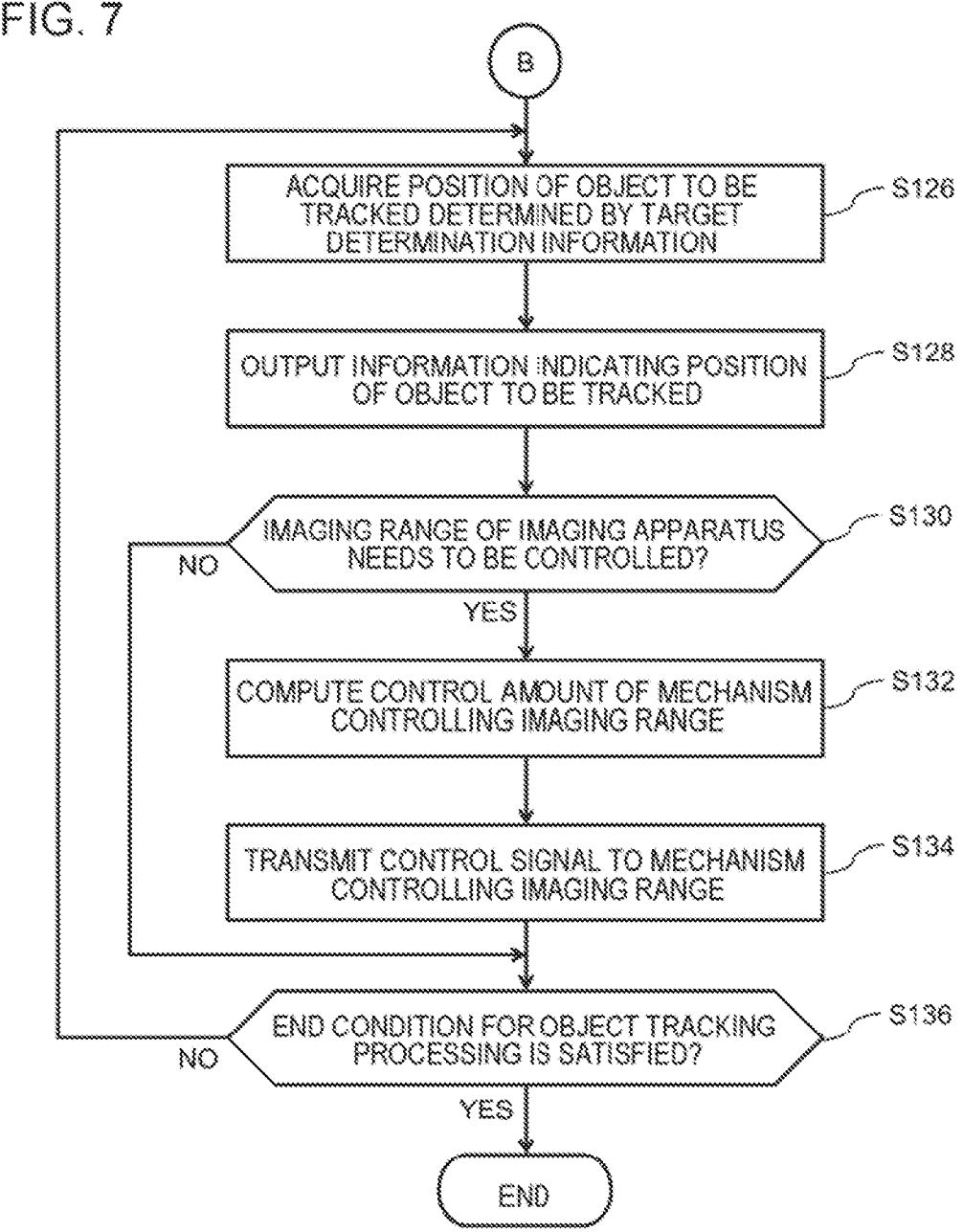
FIG. 7 is a flowchart illustrating a flow of processing executed by the object tracking apparatus according to the first example embodiment.

Hereinafter, processing executed by the object tracking apparatus 10 according to the present example embodiment will be described by using the drawings. FIGS. 5 to 7 are flowcharts illustrating a flow of the processing executed by the object tracking apparatus 10 according to the first example embodiment.

First, the object tracking apparatus 10 communicates with the imaging apparatus 20 via the network interface 1060, and acquires an image generated by the imaging apparatus 20 (S102).

After acquiring the image from the imaging apparatus 20, the image processing unit 120 performs object detection processing on the to-be-processed region $A_P$ of the image generated by the imaging apparatus 20 (S104). Note that, the "object detection processing" represents image processing of detecting an object (example: a person, a vehicle, a motorcycle, or the like) defined in advance as a detection target. The image processing unit 120 can use an object detector stored in the memory 1030, the storage device 1040, or the like to detect a predetermined object from the image acquired from the imaging apparatus 20. The object detector is constructed in such a way as to be capable of detecting a particular object (example: a person, a vehicle, a motorcycle, or the like) by, for example, machine learning. Further, the object detector may be constructed in such a way as to be capable of detecting a particular object by a rule base. Further, the object detector may be constructed in such a way as to be capable of distinctively detecting an object having a particular attribute from among objects of a same type. Specific examples of the "attribute" include, but not particularly limited to, items as listed below. Attributes of Person: age, sex, a feature of clothes, a feature of belongings, and the like Attributes of Vehicle/Motorcycle: a vehicle body color, a vehicle type, a vehicle body shape and size, a number written on a number plate, the number of seated persons, and the like Further, the object detector may be constructed in such a way as to be capable of discriminating an attribute (for example, staggering, behaving suspiciously, or the like) relating to behavior of an object and detecting a particular object having the attribute.

Figure 8:
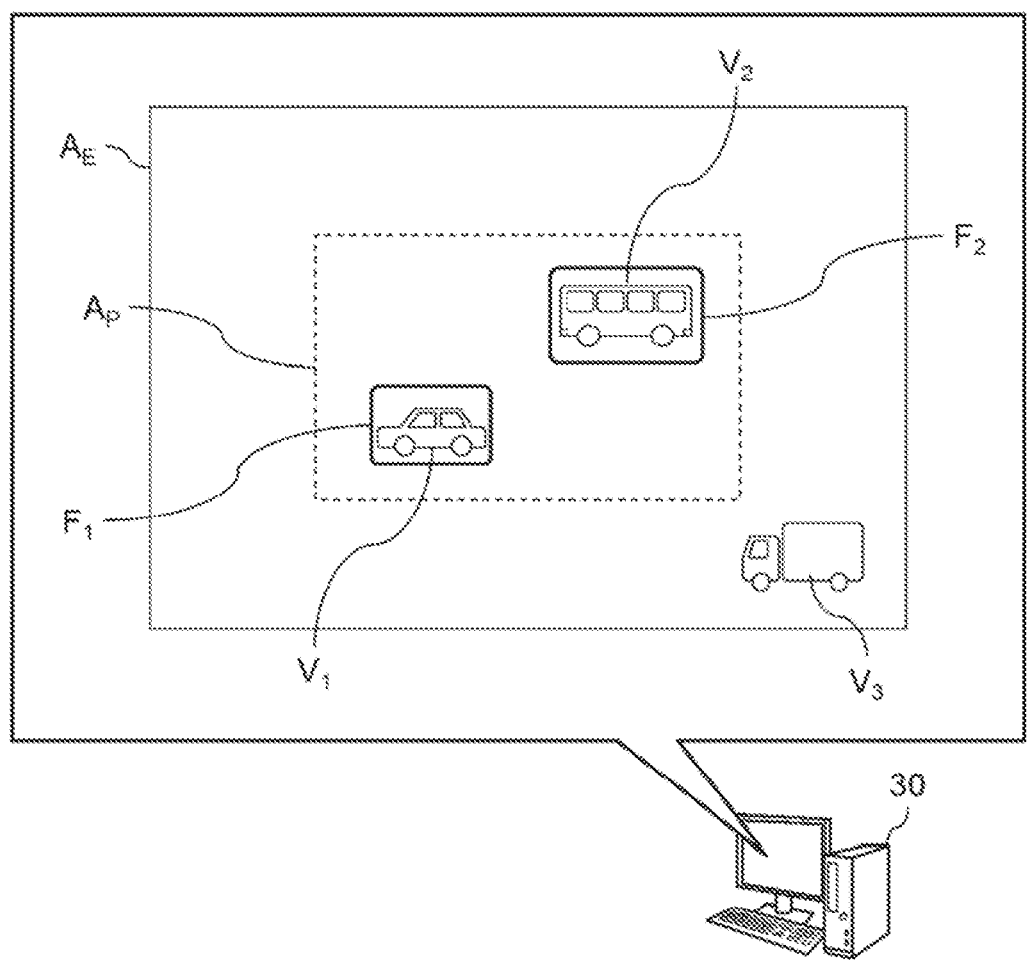
FIG. 8 is a diagram illustrating an output example of an image processing unit based on a result of object detection processing.

After executing the object detection processing, the image processing unit 120 outputs, to a display of the user terminal 30, a result of object detection acquired through the processing, in such a way as to be superimposed over the image acquired from the imaging apparatus 20 as illustrated in, for example, FIG. 8 (S106). FIG. 8 is a diagram illustrating an output example of the image processing unit 120 based on a result of the object detection processing. In the example in FIG. 8, the image processing unit 120 outputs, to the display of the user terminal 30, a result (rectangular frames $F_1$ and $F_2$) of object detection in such a way as to be superimposed over a position associated with each of objects (vehicles $V_1$ and $V_2$) detected in the to-be-processed region $A_P$. On the other hand, regarding an object (a vehicle $V_3$) positioned outside the to-be-processed region $A_P$ (in a region on which the image processing is not executed), the image processing unit 120 is unable to detect the object. Thus, regarding the vehicle $V_3$, information such as the frames $F_1$ and $F_2$ added to the vehicles $V_1$ and $V_2$ is not added.

Then, the object tracking apparatus 10 determines whether target determination information has been acquired by the target determination information acquisition unit 110 (S108). When the target determination information has not yet been acquired (S108: NO), target determination information acquisition processing is executed. A flow of the target determination information acquisition processing is illustrated in FIG. 6. On the other hand, when the target determination information has already been acquired (S108: YES), object tracking processing is executed. A flow of the object tracking processing is illustrated in FIG. 7.

<<Target Determination Information Acquisition Processing>>

Figure 9:
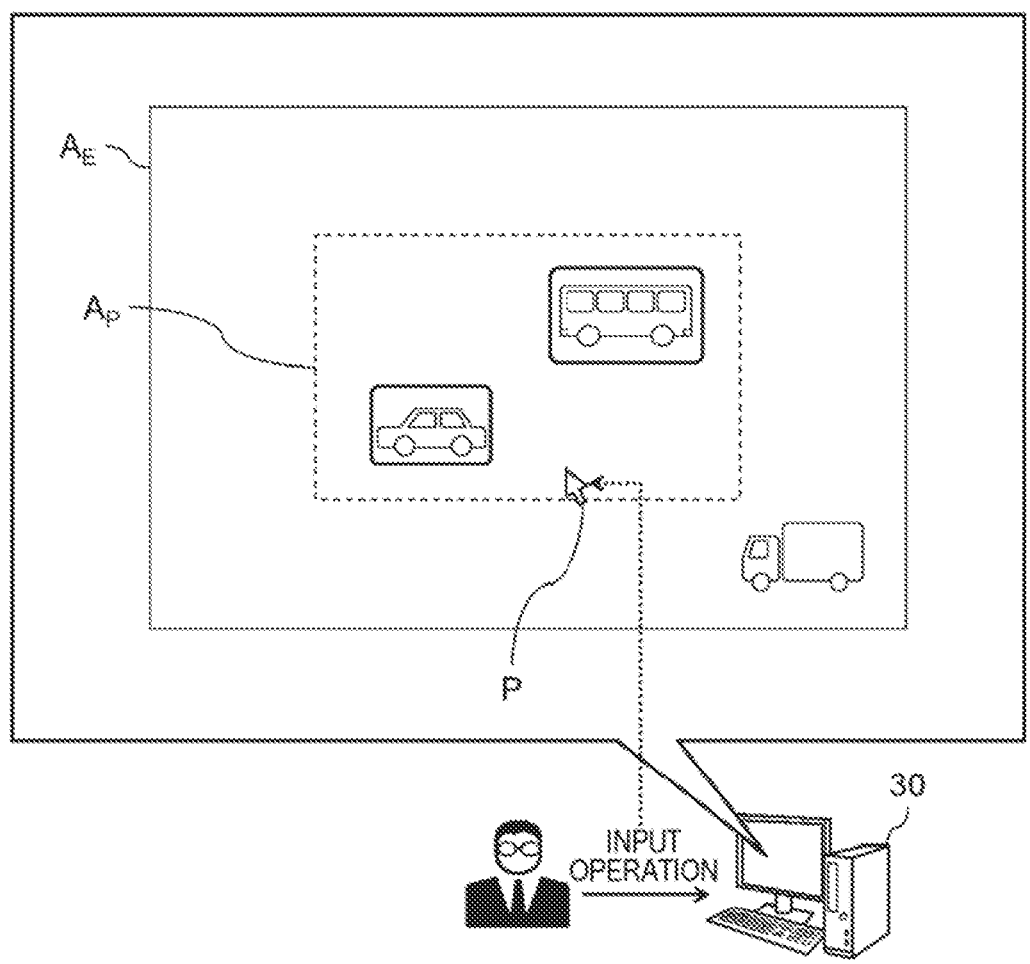
FIG. 9 is a diagram illustrating a scene in which a position specification input is performed on an image.

The target determination information acquisition unit 110 determines whether an input (position specification input) for specifying a position of the object to be tracked has been accepted (S110). For example, when a user selects a position of the object to be tracked on the image displayed on the display of the user terminal 30, information indicating the selected position (the position on image coordinates) is input to the target determination information acquisition unit 110 (example: FIG. 9). FIG. 9 is a diagram illustrating a scene in which the position specification input is performed on the image. A user can specify any position on the image by using an input apparatus (a mouse, a keyboard, a touch panel, or the like) of the user terminal 30. For example, a user can operate, by using a mouse or a touch panel, a pointer P illustrated in FIG. 9 and select any position on the image.

When a user performs the position specification input, the image processing unit 120 may display information indicating the to-be-processed region $A_P$ on the display of the user terminal 30 in such a way as to be superimposed over the image acquired from the imaging apparatus 20. For example, the image processing unit 120 may display a dashed line (the information indicating the to-be-processed region $A_P$) as illustrated in FIG. 9, actually on the display of the user terminal 30. Visualizing the to-be-processed region $A_P$ in the image in this way enables a user to easily determine whether an object is included within a region on which the image processing is executed.

Herein, in order to track an object positioned outside the to-be-processed region $A_P$ (in a region on which the image processing is not executed), the control unit 130 needs to control the imaging range of the imaging apparatus 20 in such a way that the object is included in the to-be-processed region $A_P$. Thus, when the target determination information acquisition unit 110 has accepted the position specification input (S110: YES), the control unit 130 further determines whether the position specified by the position specification input is outside the to-be-processed region $A_P$ (S112).

When the position specified by the position specification input is outside the to-be-processed region $A_P$ (S112: YES), the control unit 130 computes, for at least one of mechanisms controlling the imaging range of the imaging apparatus 20, a control amount necessary for including the specified position in the to-be-processed region $A_P$ (S114). Then, the control unit 130 transmits, to a mechanism to be operated, a control signal based on the computed control amount (S116). By the mechanism operating in response to the control signal, the position (the object existing at the position and selected as a target be tracked) specified by the position specification input is included in the to-be-processed region $A_P$. Then, the object tracking apparatus 10 acquires a new image (an image in a state in which the object selected as a target to be tracked is included in the to-be-processed region $A_P$) generated by the imaging apparatus 20 after the mechanism operating in response to the control signal (S118). Then, the target determination information acquisition unit 110 acquires, by using information on the position specified by the position specification input, target determination information for determining the object selected as a target to be tracked (S120). The target determination information acquisition unit 110 first determines, on a new image, a position associated with the position specified on the image acquired in the processing of S102. For example, the target determination information acquisition unit 110 can determine, on the new image, a position associated with the specified position, based on the specified position on the image acquired in the processing of S102 and the control amount (amount of moving the imaging range) in S114. Then, the target determination information acquisition unit 110 acquires, as target determination information for determining the object to be tracked, a feature value of an object detected at the position determined on the new image. Then, by using the target determination information acquired herein, the object tracking processing as illustrated in FIG. 7 is executed.

On the other hand, when the position specified by the position specification input is inside the to-be-processed region $A_P$ (S112: NO), the processing from S114 to S118 as described above is not executed. In this case, the target determination information acquisition unit 110 acquires, by using information on the position specified by the position specification input, a feature value of an object detected at the position, as target determination information for determining the object to be tracked (S120). Then, by using the target determination information acquired herein, the object tracking processing as illustrated in FIG. 7 is executed.

When the target determination information acquisition unit 110 has not accepted the position specification input in determination in S110 (S110: NO), the target determination information acquisition unit 110 further determines whether an object matching a predetermined condition has been detected in the object detection processing in S104 (S122). Herein, the predetermined condition is a condition for determining as the object to be tracked. Specific examples of the "predetermined condition" include, but not particularly limited to, "a person wearing a backpack", "a red sedan-type car", "a bicycle with two riders", and the like. Further, the "predetermined condition" may indicate a feature relating to a suspect's appearance (a hairstyle, clothes, belongings, or the like). Information relating to such a predetermined condition may be stored in advance in the memory 1030 or the storage device 1040, or may be input by a user to the object tracking apparatus 10 via the user terminal 30.

When an object matching a predetermined condition has been detected in the object detection processing in S104 (S122: YES), the target determination information acquisition unit 110 acquires, as target determination information, a feature value of the detected object (S124). Then, by using the target determination information acquired herein, the object tracking processing as illustrated in FIG. 7 is executed. On the other hand, when an object matching a predetermined condition has not been detected in the object detection processing in S104 (S122: NO), the processing returns to S102, and the above-described processing is repeated for an image newly acquired from the imaging apparatus 20.

<<Object Tracking Processing>>

Figure 10:
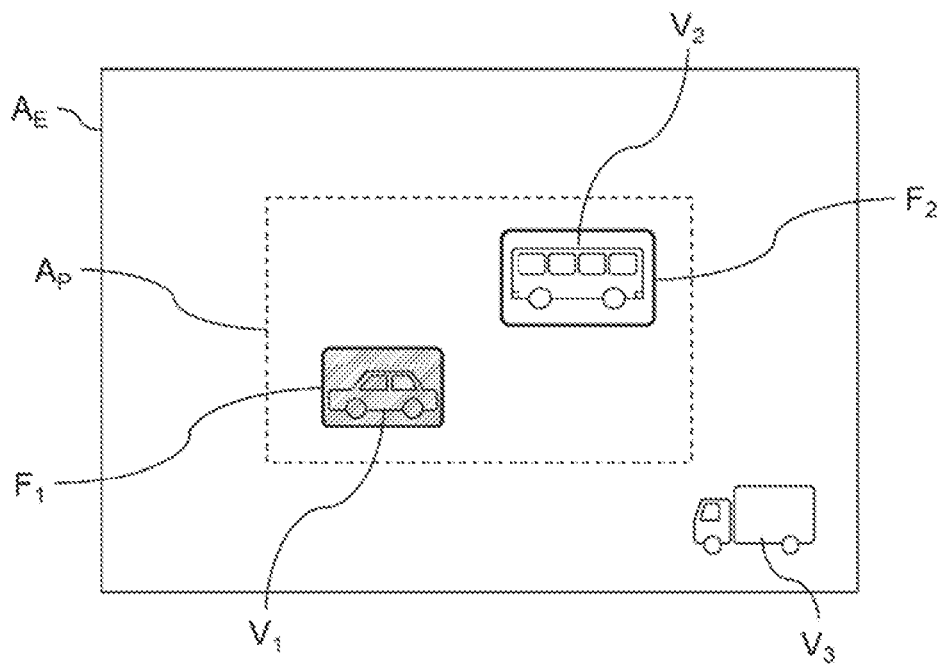
FIG. 10 is a diagram illustrating an output example of the image processing unit based on a result of object detection processing.

The image processing unit 120 determines, as the object to be tracked, an object associated with the target determination information acquired in the preceding processing, from among objects detected in the object detection processing in S104, and acquires a position (a position on an image coordinate system) of the object to be tracked (S126). Then, the image processing unit 120 outputs, to the display of the user terminal 30, information indicating the position of the object to be tracked, as illustrated in, for example, FIG. 10 (S128). FIG. 10 is a diagram illustrating an output example of the image processing unit 120 based on a result of the object detection processing. Note that, in FIG. 10, a case in which an object determined by the target determination information is the vehicle $V_1$ is illustrated. In this case, the image processing unit 120 displays information indicating a position of the vehicle $V_1$ (the object to be tracked) in a way superimposed over the image acquired from the imaging apparatus 20. For example, as illustrated in FIG. 10, the image processing unit 120 notifies a user of a fact that the vehicle $V_1$ is being tracked, by superimposing information highlighting a region associated with the vehicle $V_1$ over the image. Note that, other than the example in FIG. 10, the image processing unit 120 may use different display colors or display states for the frame $F_1$ associated with the vehicle $V_1$ (the object to be tracked) and the frame $F_2$ associated with the vehicle $V_2$ (another detected object). Further, the image processing unit 120 may display a message, a mark, or the like indicating a fact that the vehicle $V_1$ is a target to be tracked, in association with the vehicle $V_1$.

Then, the control unit 130 determines whether the imaging range of the imaging apparatus 20 needs to be controlled, based on the position of the object to be tracked acquired in the processing of S126 (S130). Specifically, the control unit 130 determines whether the imaging range of the imaging apparatus 20 needs to be controlled, by comparing the position of the object to be tracked with a position of the predetermined region a (a region including a central portion of the image) as illustrated in FIG. 3.

When it is determined that the imaging range of the imaging apparatus 20 needs to be controlled, such as, for example, when the position of the object to be tracked is outside the predetermined region a (S130: YES), the control unit 130 computes, for at least one of mechanisms controlling the imaging range of the imaging apparatus 20, a control amount necessary for including the position of the object to be tracked in the to-be-processed region $A_P$ (S132). Then, the control unit 130 transmits, to a mechanism to be operated, a control signal based on the computed control amount (S134). By the mechanism operating in response to the control signal, the object to be tracked is included in the predetermined region a. On the other hand, when it is determined that the imaging range of the imaging apparatus 20 does not need to be controlled (S130: NO), the control unit 130 does not execute the above-described processing.

Then, the control unit 130 performs end determination for the object tracking processing (S136). Specific examples of an end condition for the object tracking processing include, but not particularly limited to, "a processing end instruction is input in the user terminal 30", "the mechanism controlling the imaging range of the imaging apparatus 20 has reached a movable limit", "the object tracking processing has been continued for a predetermined period of time or a predetermined distance or more", and the like. When the end condition for the object tracking processing is not satisfied (S136: NO), the processing returns to S126, and the object tracking processing is continued by using an image newly acquired from the imaging apparatus 20.

<<Processing when Object to be Tracked is Lost>>

Herein, when the object to be tracked moves drastically, when the object to be tracked and another object similar to the object come close to each other (pass by each other), or the like, the object tracking apparatus 10 may lose sight of the object to be tracked. "Lose sight" herein means that the object tracking apparatus 10 is no longer able to identify which object is an object associated with the target determination information.

Figure 11:
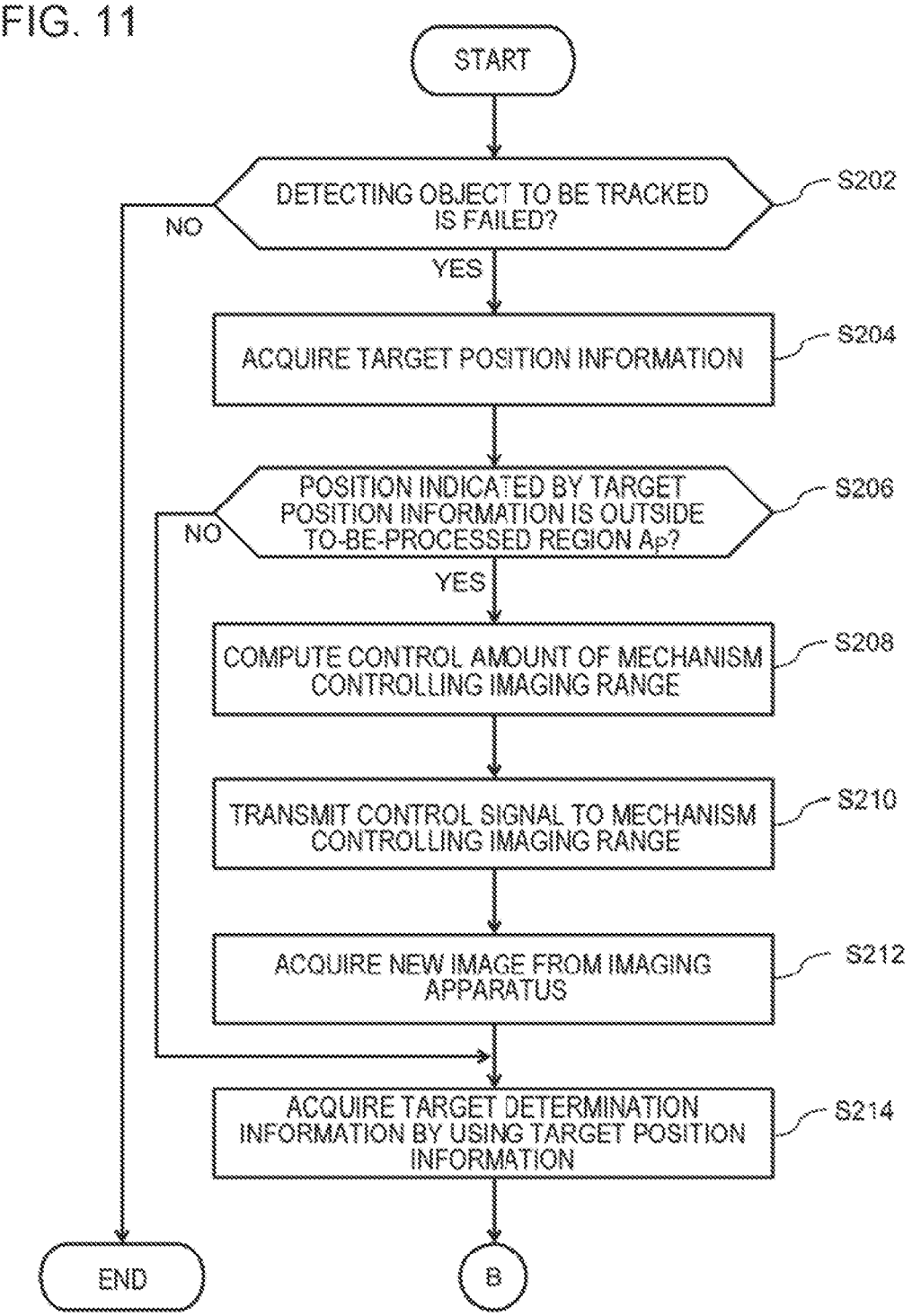
FIG. 11 is a flowchart illustrating a flow of processing executed by the object tracking apparatus when an object to be tracked is lost.

In this case, the object tracking apparatus 10 executes processing as illustrated in FIG. 11. FIG. 11 is a flowchart illustrating a flow of processing executed by the object tracking apparatus 10 when the object to be tracked is lost.

When the image processing unit 120 has failed in detecting the object to be tracked (has lost sight of the object to be tracked) in the to-be-processed region $A_P$ (S202: YES), the target determination information acquisition unit 110 acquires information (hereinafter, also written as "target position information") indicating a position of the object in the image acquired from the imaging apparatus 20 (S204). Upon acquisition of the target position information by the target determination information acquisition unit 110, the control unit 130 further determines whether the position indicated by the target position information is outside the to-be-processed region $A_P$ (S206).

When the position indicated by the target position information is outside the to-be-processed region $A_P$ (S206: YES), the control unit 130 determines that the imaging range of the imaging apparatus 20 needs to be controlled. In this case, the control unit 130 computes, for at least one of mechanisms controlling the imaging range of the imaging apparatus 20, a control amount necessary for including the position indicated by the target position information in the to-be-processed region $A_P$ (S208). Then, the control unit 130 transmits, to a mechanism to be operated, a control signal based on the computed control amount (S210). By the mechanism operating in response to the control signal, the position (the lost object existing at the position) indicated by the target position information is included in the to-be-processed region $A_P$. Then, the object tracking apparatus 10 acquires a new image (an image in a state in which the lost object is included in the to-be-processed region $A_P$) generated by the imaging apparatus 20 after the mechanism operating in response to the control signal (S212). Then, the target determination information acquisition unit 110 acquires, by using the position indicated by the target position information, target determination information for redetermining the lost object (S214). Then, by using the target determination information acquired herein, the object tracking processing as illustrated in FIG. 7 is resumed.

On the other hand, when the position indicated by the target position information is inside the to-be-processed region $A_P$ (S206: NO), the processing from S206 to S212 as described above is not executed. In this case, the target determination information acquisition unit 110 acquires, by using the position indicated by the target position information, target determination information for redetermining the lost object (S214). Then, by using the target determination information acquired herein, the object tracking processing as illustrated in FIG. 7 is executed.

The flow of the processing from S206 to S214 in FIG. 11 described above is similar to the flow of the processing from S114 to S120 in FIG. 6.

Figure 12:
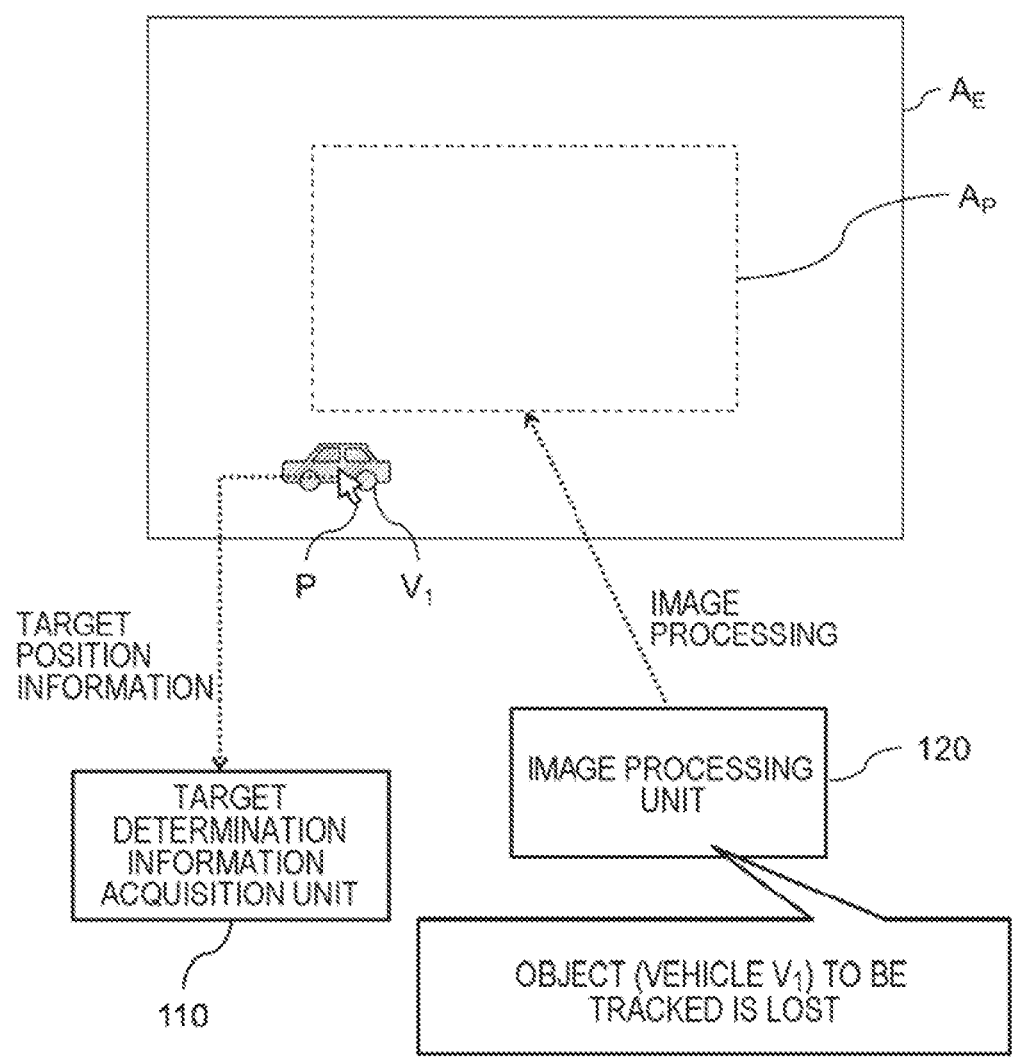
FIG. 12 is a diagram illustrating a flow of acquiring target position information when the object to be tracked is lost.
Figure 13:
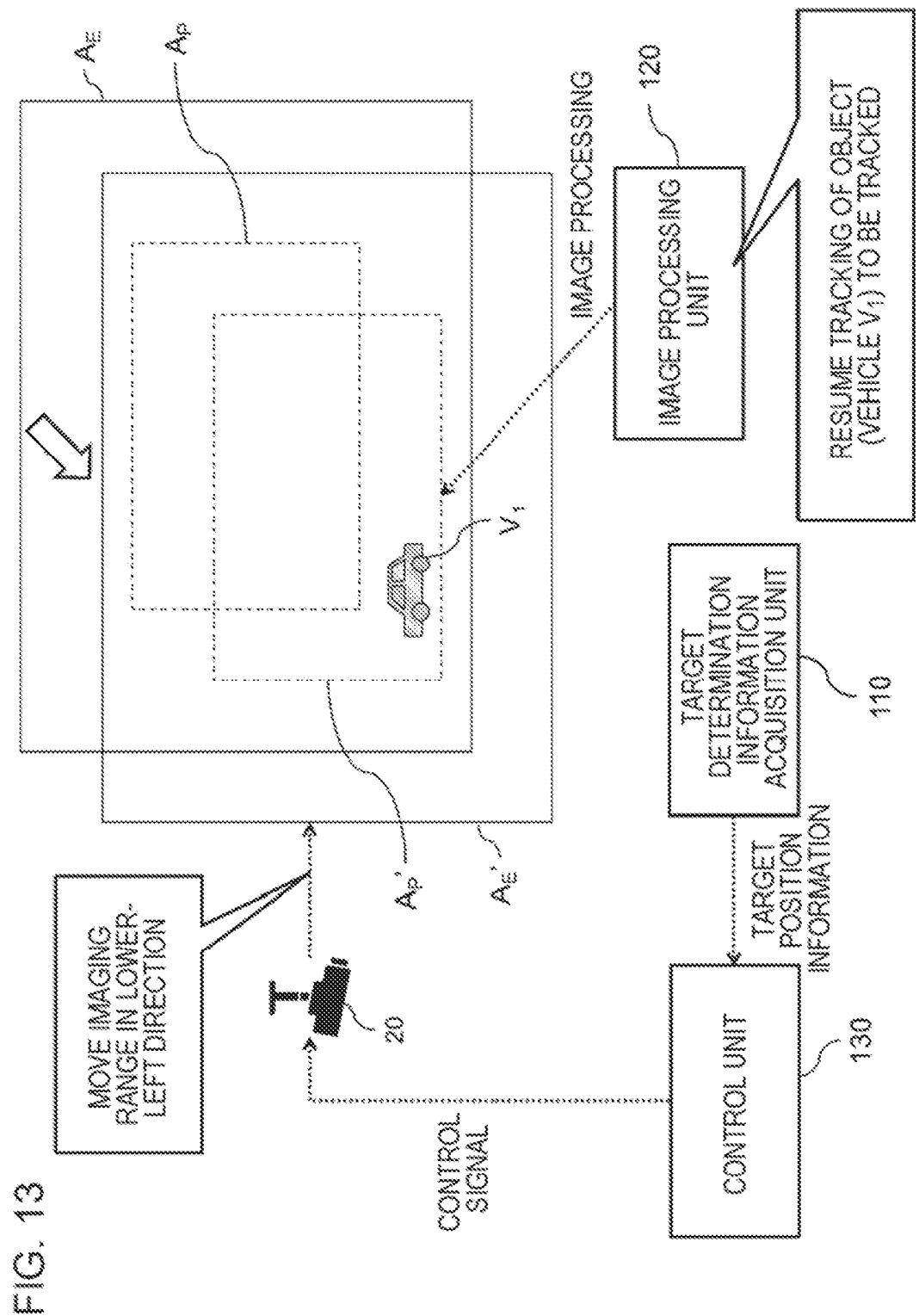
FIG. 13 is a diagram illustrating a flow of acquiring the target position information when the object to be tracked is lost.

The above-described processing will be described specifically by using FIGS. 12 and 13. FIGS. 12 and 13 are diagrams illustrating a flow of acquiring the target position information when the object to be tracked is lost. For example, when the object (the vehicle $V_1$) to be tracked moves at a velocity exceeding an operation velocity of the mechanism controlling the imaging range of the imaging apparatus 20, the object (the vehicle $V_1$) to be tracked may come outside the to-be-processed region $A_P$, as illustrated in FIG. 12. In this case, the image processing unit 120 is unable to detect the object to be tracked, resulting in losing sight of the object. However, as illustrated in FIG. 12, when taking the entire region $A_E$ of the image into account, the object (the vehicle $V_1$) to be tracked may be included in a region outside the to-be-processed region $A_P$. In this case, the object tracking apparatus 10 can be notified of a current position of the lost object by a user selecting a position of the object to be tracked in the region outside the to-be-processed region $A_P$. The target determination information acquisition unit 110 acquires information on the position selected by a user (for example, the position indicated by the pointer P) in this way, as the above-described target position information.

The target position information acquired in an example in FIG. 12 indicates the position outside the to-be-processed region $A_P$. Thus, as illustrated in FIG. 13, the control unit 130 generates and transmits a control signal for causing the mechanism controlling the imaging range of the imaging apparatus 20 to operate, based on the target position information acquired by the target determination information acquisition unit 110. With the control signal, the mechanism adjusting a zoom factor, a direction, a position, or the like of the imaging apparatus 20 operates in such a way that the position selected by a user (for example, the position indicated by the pointer P) is included in the to-be-processed region $A_P$. In an example in FIG. 13, the control unit 130 transmits a control signal controlling an operation of the mechanism adjusting a zoom factor, a direction, a position, or the like of the imaging apparatus 20 in such a way that the imaging range of the imaging apparatus 20 moves in a lower-left direction. Then, as illustrated in FIG. 13, the imaging range of the imaging apparatus 20 moves in the lower-left direction. The image processing unit 120 can resume tracking of the object (the vehicle $V_1$) to be tracked by performing image processing on a to-be-processed region $A_P{'}$ in the imaging range moved by the control signal.

Second Example Embodiment

An object tracking apparatus 10 according to the present example embodiment is different from the above-described first example embodiment in a point that a recording unit as described below is further included.

Function Configuration Example

Figure 14:
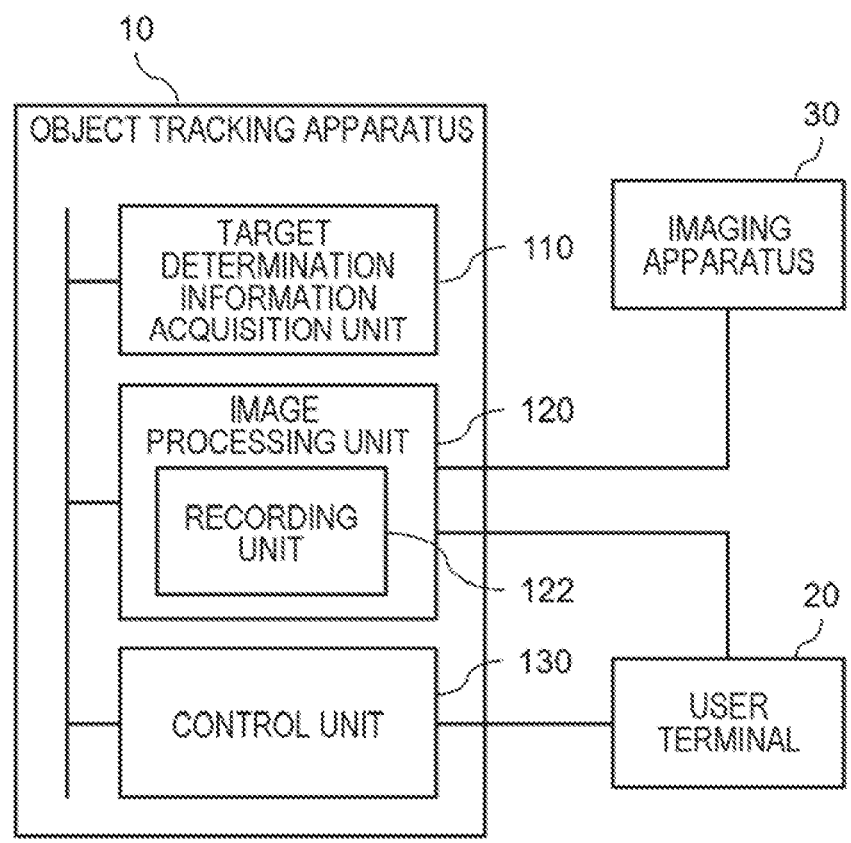
FIG. 14 is a diagram illustrating a function configuration example of an object tracking apparatus according to a second example embodiment.

FIG. 14 is a diagram illustrating a function configuration example of the object tracking apparatus 10 according to a second example embodiment. As illustrated in FIG. 14, the object tracking apparatus 10 according to the present example embodiment includes a recording unit 122, in addition to the configuration described in the first example embodiment. The recording unit 122 stores, as recorded data, an image acquired from an imaging apparatus 20 in a predetermined storage area (for example, a storage device 1040 or the like) during a period from when an object to be tracked is detected to when a predetermined end condition is satisfied.

<Flow of Processing>

Figure 15:
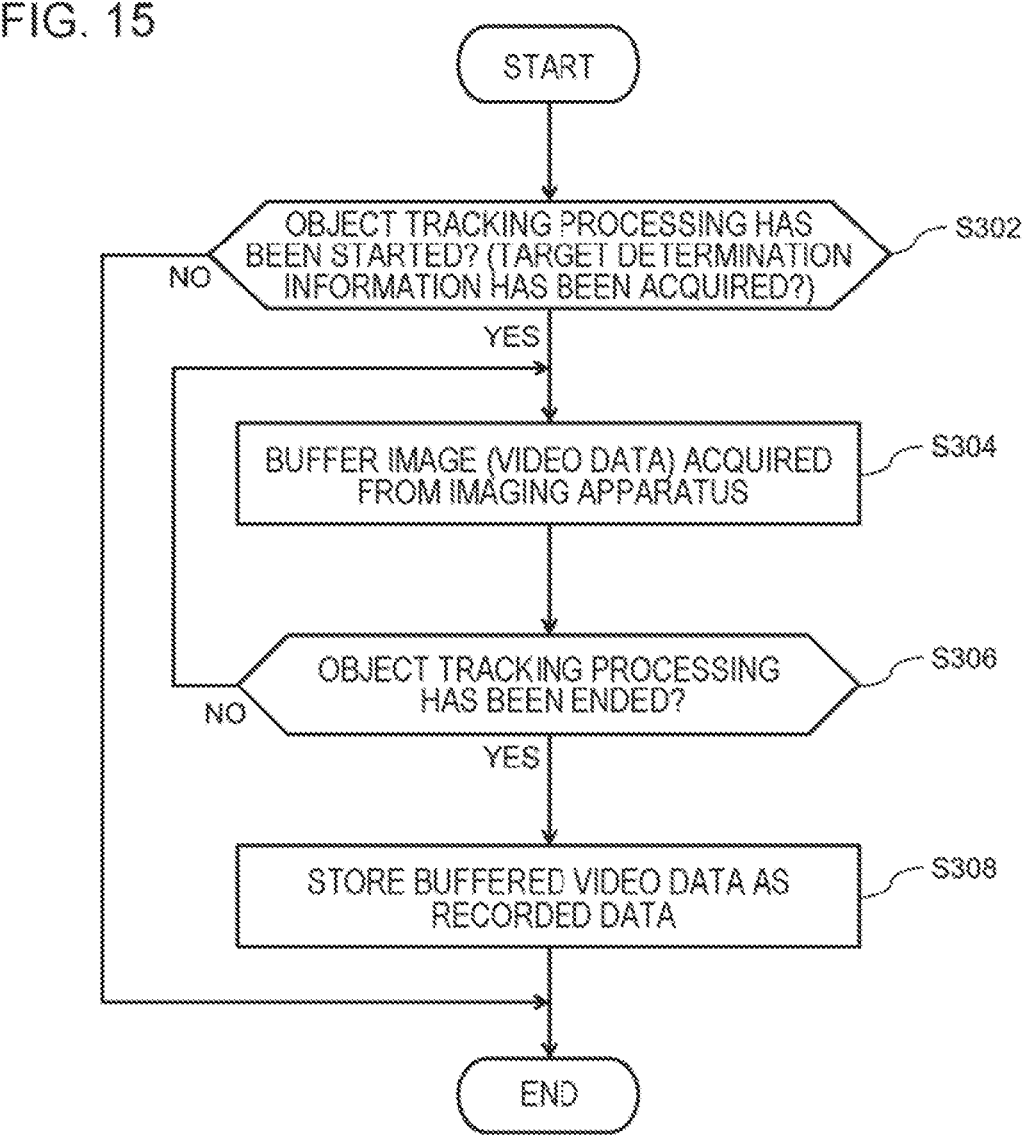
FIG. 15 is a flowchart illustrating a flow of recording processing executed by the object tracking apparatus according to the second example embodiment.

Hereinafter, processing executed by the object tracking apparatus 10 according to the present example embodiment will be described by using the drawing. FIG. 15 is a flowchart illustrating a flow of recording processing executed by the object tracking apparatus 10 according to the second example embodiment.

First, the recording unit 122 determines whether object tracking processing has been started (S302). Specifically, the recording unit 122 determines whether target determination information has been acquired by a target determination information acquisition unit 110 through the processing as illustrated in FIG. 6. Herein, when object tracking processing has not been started (S302: NO), processing to be described below is not executed.

When object tracking processing has been started, that is, when target determination information has been acquired by the target determination information acquisition unit 110 (S302: YES), the recording unit 122 buffers an image (video data) acquired from the imaging apparatus 20 in, for example, a memory 1030 or the like (S304). Subsequently, the recording unit 122 continues buffering an image (video data) acquired from the imaging apparatus 20 until the object tracking processing is ended (S306: NO). Then, when the object tracking processing has been ended (S306: YES), the recording unit 122 stores, in the storage device 1040 or the like, the video data buffered in the memory 1030 or the like, as recorded data indicating a result of the object tracking processing (S308).

According to the present example embodiment described above, along with start of the object tracking processing described in the first example embodiment, recorded data indicating a result of the object tracking processing are generated and stored, based on the video data acquired from the imaging apparatus 20. The recorded data indicating a result of the past object tracking processing is useful in confirmation work performed by a user. For example, a user can perform careful confirmation of a motion of a concerned object to be tracked, by reviewing the recorded data on the object to be tracked.

Herein, in a situation in which object tracking processing has not been performed (that is, target determination information has not been acquired), for example, the recording unit 122 may generate and store a time lapse video by using an image (video data) acquired from the imaging apparatus 20. By performing confirmation of the time lapse video, a user can roughly recognize situations before and after start of tracking processing of a certain object. In this case, the recording unit 122 may store the above-described recorded data and the time lapse video as separate files in the storage device 1040 or the like, or may store the above-described recorded data and the time lapse video as one file in the storage device 1040 or the like.

Third Example Embodiment

An object tracking apparatus 10 according to the present example embodiment is different from the first example embodiment in a point that a report generation unit as described below is further included.

Function Configuration Example

Figure 16:
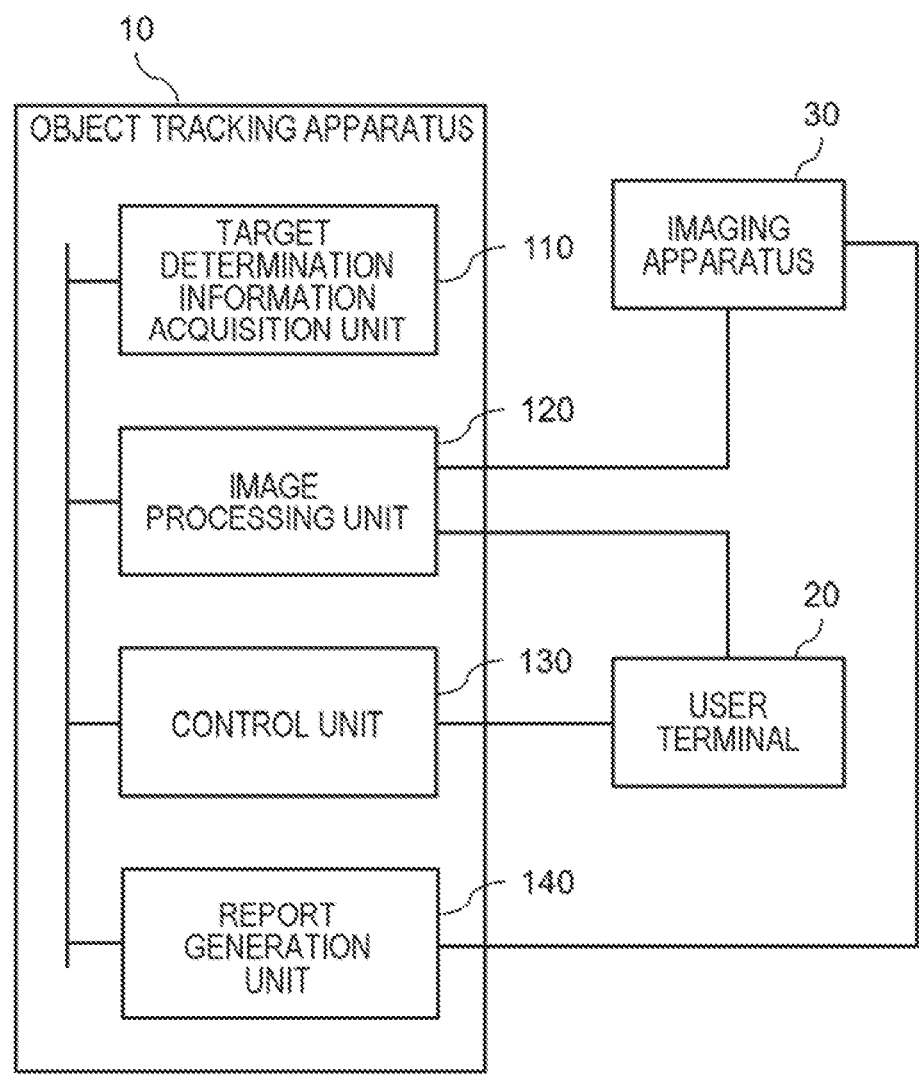
FIG. 16 is a block diagram illustrating a function configuration example of an object tracking apparatus according to a third example embodiment.

FIG. 16 is a block diagram illustrating a function configuration example of the object tracking apparatus 10 according to a third example embodiment. As illustrated in FIG. 16, the object tracking apparatus 10 according to the present example embodiment further includes a report generation unit 140.

The report generation unit 140 generates a report file indicating a result of object tracking processing. The report file generated by the report generation unit 140 includes, for example, an image indicating an object to be tracked, information relating to a period (time and date) for which tracking processing has been performed, information relating to a place where the tracking processing has been executed, a movement trajectory of the object to be tracked, and the like. Further, when the object tracking apparatus 10 includes a recording unit 122 described in the second example embodiment, the report file may further include a link address to recorded data generated according to the object tracking processing. The image indicating the object to be tracked is, for example, a representative image (for example, when recorded data are generated according to the above-described second example embodiment, a thumbnail image of the recorded data) out of images acquired from an imaging apparatus 20, or the like. Besides the image, the report generation unit 140 may further include, in the report file, text information relating to the object to be tracked. The text information relating to the object to be tracked is, for example, information indicating a category (a person, a vehicle, or the like) of the object or an attribute (example: "wearing a backpack" for a person, and "a red sedan-type" for a vehicle) of the object, or the like. The information relating to the place where the tracking processing has been executed is, for example, information indicating a point (an address or the like) at which the imaging apparatus 20 is installed, information determining the individual imaging apparatus 20, such as a number uniquely assigned to each imaging apparatus 20, or the like.

<Flow of Processing>

Figure 17:
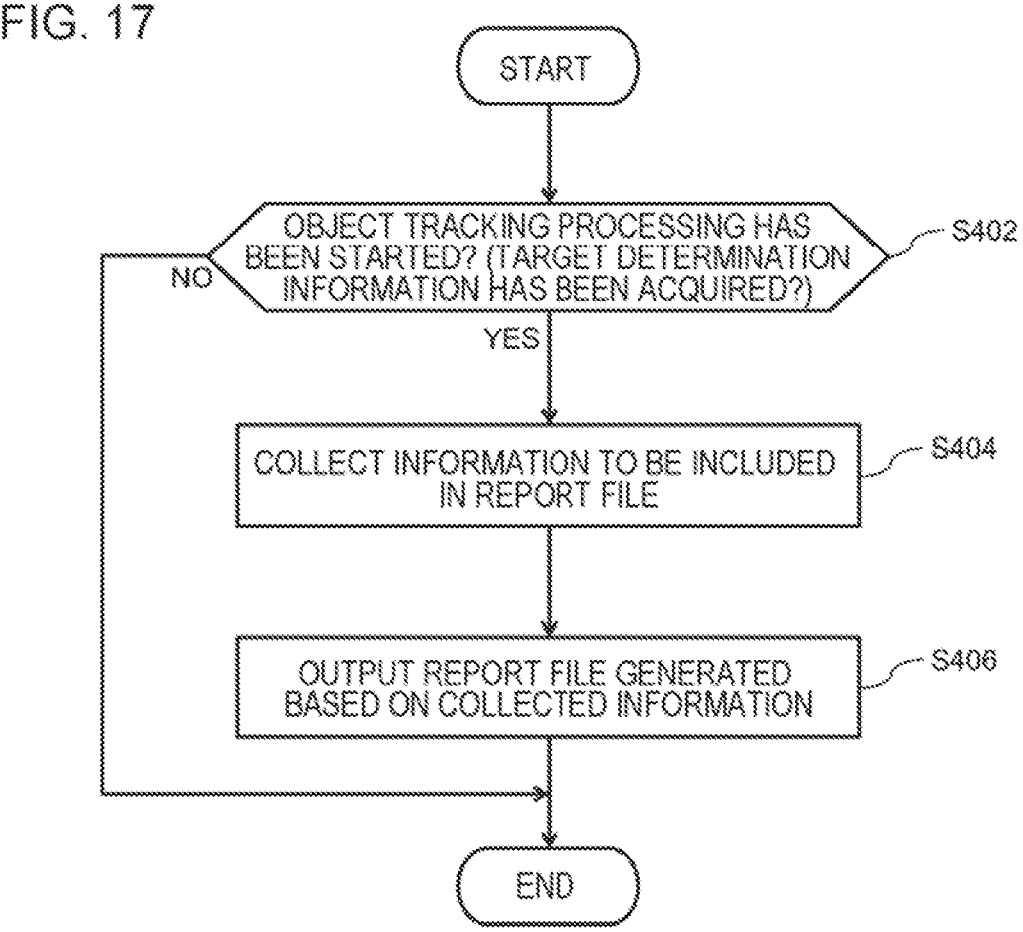
FIG. 17 is a flowchart illustrating a flow of report generation processing executed by the object tracking apparatus according to the third example embodiment.

Hereinafter, processing executed by the object tracking apparatus 10 according to the present example embodiment will be described by using the drawing. FIG. 17 is a flowchart illustrating a flow of report generation processing executed by the object tracking apparatus 10 according to the third example embodiment.

First, the report generation unit 140 determines whether object tracking processing has been started (S402). Specifically, the report generation unit 140 determines whether target determination information has been acquired by a target determination information acquisition unit 110 through the processing as illustrated in FIG. 6. Herein, when object tracking processing has not been started (S402: NO), processing to be described below is not executed.

When object tracking processing has been started, that is, when target determination information has been acquired by the target determination information acquisition unit 110 (S402: YES), the report generation unit 140 collects information to be included in a report file during a period from start to end of the object tracking processing (S404).

For example, the report generation unit 140 determines one representative image from among images acquired from the imaging apparatus 20 during execution of the object tracking processing. For example, the report generation unit 140 can convert, based on a direction, a degree of less blurring, brightness, and the like of an object to be tracked being a subject of an image, visibility of the object in each image into a numerical value, and can include, in the report file, an optimum image based on the numerical value, as a representative image. Further, the report generation unit 140 can include, in the report file, a result (for example, "a vehicle", "a red sedan-type vehicle", or the like) of inputting an image generated by the imaging apparatus 20 to an object detector, as text information. Further, the report generation unit 140 can acquire a start time and an end time of the object tracking processing, and can include, in the report file, the start time and the end time as information indicating a period for which the object tracking processing has been performed. Further, the report generation unit 140 can acquire an installation place of the imaging apparatus 20 having generated the image used in the object tracking processing, a specific number unique to the imaging apparatus 20, and the like, and can include, in the report file, the installation place, the specific number, and the like as information indicating a point at which the object tracking processing has been executed. Further, the report generation unit 140 can include, in the report file, information indicating a movement locus of the object to be tracked that can be acquired by converting a position of the object on each image into a position on a map. In this case, the report generation unit 140 may use, for example, a function that converts the position on the image into the position on the map, based on a pose (an angle of pan/tilt) of the imaging apparatus 20 and a position of the imaging apparatus 20. Such a function is stored in advance in, for example, a memory 1030 or a storage device 1040. Further, when the object tracking apparatus 10 further includes the recording unit 122 described in the second example embodiment, the report generation unit 140 can include, in the report file, information indicating a link address to recorded data output at an end time of the object tracking processing.

Then, the report generation unit 140 outputs, to the storage device 1040, a user terminal 30, or the like, the report file generated based on the information collected in S404 (S406).

According to the present example embodiment described above, when object tracking processing is executed, a report file on the object tracking processing is generated and output. The configuration according to the present example embodiment enables a user to easily manage and recognize performance of the object tracking processing.

While the example embodiments of the present invention have been described with reference to the drawings, the above-described example embodiments are illustrative of the present invention, and various configurations other than the above may be employed.

Further, while a plurality of steps (processing) are described in order in a plurality of sequence diagrams or flowcharts used in the above description, execution order of the steps executed in each of the example embodiments is not limited to the described order. In each of the example embodiments, the order of the illustrated steps can be changed, as long as the change does not interfere with the contents. Further, the above-described example embodiments can be combined, as long as the contents do not contradict each other.

The whole or part of the above-described example embodiments can be described as, but not limited to, the following supplementary notes.

1.

An object tracking apparatus including:

a target determination information acquisition unit that acquires target determination information determining an object to be tracked;

an image processing unit that detects the object to be tracked and tracks the detected object by performing image processing on a to-be-processed region being a partial region of an image acquired from an imaging apparatus; and a control unit that controls an imaging range of the imaging apparatus in such a way that the object to be tracked is included in the to-be-processed region.

2.

The object tracking apparatus according to supplementary note 1, wherein
the target determination information acquisition unit acquires the target determination information in response to an input of a position of the object to be tracked on the image.

3.

The object tracking apparatus according to supplementary note 2, wherein
the target determination information acquisition unit acquires the target determination information in response to an input for selecting a position of the object to be tracked on the image displayed on a display.

4.

The object tracking apparatus according to any one of supplementary notes 1 to 3, wherein
the target determination information acquisition unit executes processing of acquiring information indicating a position of the object to be tracked on the image, when detection of the object to be tracked fails in the image processing.

5.

The object tracking apparatus according to any one of supplementary notes 1 to 4, wherein
the to-be-processed region is a region including a central portion of the image.

6.

The object tracking apparatus according to supplementary note 5, wherein
the control unit controls the imaging range of the imaging apparatus in such a way that the object to be tracked is included in a predetermined region including a central portion of the image and being a part of the to-be-processed region.

7.

The object tracking apparatus according to any one of supplementary notes 1 to 6, wherein
a size of the to-be-processed region is determined in advance.

8.

The object tracking apparatus according to supplementary note 7, wherein
a size of the to-be-processed region is determined based on a size of a resource allocatable to image processing on the to-be-processed region.

9.

The object tracking apparatus according to any one of supplementary notes 1 to 8, further including
a recording unit that stores, as recorded data, an image acquired from the imaging apparatus during a period from when the object to be tracked is detected to when a predetermined end condition is satisfied.

10.

The object tracking apparatus according to any one of supplementary notes 1 to 9, wherein
the image processing unit displays, on a display, information indicating the to-be-processed region in such a way as to be superimposed over the image.

11.

The object tracking apparatus according to any one of supplementary notes 1 to 10, wherein
the control unit controls the imaging range of the imaging apparatus by operating at least any one of a mechanism controlling a zoom of the imaging apparatus, a mechanism controlling a direction of the imaging apparatus, and a mechanism controlling a position of the imaging apparatus.

12.

An object tracking method executed by a computer, the object tracking method including:
acquiring target determination information determining an object to be tracked;
detecting the object to be tracked and tracking the detected object by performing image processing on a to-be-processed region being a partial region of an image acquired from an imaging apparatus; and
controlling an imaging range of the imaging apparatus in such a way that the object to be tracked is included in the to-be-processed region.

13.

The object tracking method according to supplementary note 12, further including,
acquiring the target determination information in response to an input of a position of the object to be tracked on the image.

14.

The object tracking method according to supplementary note 13, further including,
acquiring the target determination information in response to an input for selecting a position of the object to be tracked on the image displayed on a display.

15.

The object tracking method according to any one of supplementary notes 12 to 14, further including,
executing processing of acquiring information indicating a position of the object to be tracked on the image, when detection of the object to be tracked fails in the image processing.

16.

The object tracking method according to any one of supplementary notes 12 to 15, further including
the to-be-processed region being a region including a central portion of the image.

17.

The object tracking method according to supplementary note 16, further including,
controlling the imaging range of the imaging apparatus in such a way that the object to be tracked is included in a predetermined region including a central portion of the image and being a part of the to-be-processed region.

18.

The object tracking method according to any one of supplementary notes 12 to 17, further including
a size of the to-be-processed region being determined in advance.

19.

The object tracking method according to supplementary note 18, further including
a size of the to-be-processed region being determined based on a size of a resource allocatable to an image processing on the to-be-processed region.

20.

The object tracking method according to any one of supplementary notes 12 to 19, further including,
storing, as recorded data, an image acquired from the imaging apparatus during a period from when the object to be tracked is detected to when a predetermined end condition is satisfied.

21.

The object tracking method according to any one of supplementary notes 12 to 20, further including,
   displaying, on a display, information indicating the to-be-processed region in such a way as to be superimposed over the image.

22.

The object tracking method according to any one of supplementary notes 12 to 21, further including,
   controlling the imaging range of the imaging apparatus by operating at least any one of a mechanism controlling a zoom of the imaging apparatus, a mechanism controlling a direction of the imaging apparatus, and a mechanism controlling a position of the imaging apparatus.

23.

A program causing a computer to execute the object tracking method according to any one of supplementary notes 12 to 22.

The invention claimed is:

1. A camera controlling apparatus comprising:
   at least one memory storing instructions; and
   at least one processor configured to execute the instructions to perform operations comprising:
      tracking an object within a first range, the first range including a part of a first frame captured by a camera and the first range being narrower than the first frame;
      controlling the camera to pan or tilt to display the object in a center of a second frame which is captured by the camera after the first frame in response to that the object is shown at a first position, the first position being a position within the first range and a position different from the center of the first frame, in a case where a size of the first range is controlled to be a first size; and
      sending the second frame to a user equipment,
      wherein the size of the first range is configured to be controllable,
      wherein the controlling the camera to pan or tilt is executed in response to that the object is shown at a second position, in a case where the size of the first range is controlled to be a second size, the second size being larger than the first size,
      wherein the second position is more distant from the center of the first frame than the first position, and is a position within the controlled first range.

2. The camera controlling apparatus according to claim 1, wherein the camera is not controlled to pan or tilt if the position of the object stays within a third range being smaller than the first range and being located at an inner side of the first range, even if the object is not displayed in a center of the first frame.

3. The camera controlling apparatus according to claim 1, wherein the camera captures a same field of view of the first frame if the position of the object stays within a third range being smaller than the first range and being located at an inner side of the first range, even if the object is not displayed in a center of the first frame.

4. The camera controlling apparatus according to claim 1, wherein the operations further comprise controlling the camera to pan or tilt if the position of the object within the first range is detected outside a third range, the third range being smaller than the first range and being located at an inner side of the first range.

5. The camera controlling apparatus according to claim 1, wherein the object includes a vehicle.

6. The camera controlling apparatus according to claim 1, wherein the object includes a person.

7. The camera controlling apparatus according to claim 1, wherein the operations further comprise receiving a request to use the first range from the user equipment.

8. A camera comprising:
   at least one memory storing instructions; and
   at least one processor configured to execute the instructions to perform operations comprising:
      tracking an object within a first range, the first range indicating a part of a first frame captured by the camera and the first range being narrower than the first frame;
      controlling the camera to pan or tilt to display the object in a center of a second frame which is captured by the camera after the first frame in response to that the object is shown at a first position, the first position being a position within the first range and a position different from the center of the first frame, in a case where a size of the first range is controlled to be a first size; and
      sending the second frame to a user equipment,
      wherein the size of the first range is configured to be controllable,
      wherein the controlling the camera to pan or tilt is executed in response to that the object is shown at a second position, in a case where the size of the first range is controlled to be a second size, the second size being larger than the first size,
      wherein the second position is more distant from the center of the first frame than the first position, and is a position within the controlled first range.

9. The camera according to claim 8, wherein the camera is not controlled to pan or tilt if the position of the object stays within a third range being smaller than the first range and being located at an inner side of the first range, even if the object is not displayed in a center of the first frame.

10. The camera according to claim 8, wherein the camera captures a same field of view of the first frame if the position of the object stays within a third range being smaller than the first range and being located at an inner side of the first range, even if the object is not displayed in a center of the first frame.

11. The camera according to claim 8, wherein the operations further comprise controlling the camera to pan or tilt if the position of the object within the first range is detected outside a third range, the third range being smaller than the first range and being located at an inner side of the first range.

12. The camera according to claim 8, wherein the object includes a vehicle.

13. The camera according to claim 8, wherein the object includes a person.

14. The camera according to claim 8, wherein the operations further comprise receiving a request to use the first range from the user equipment.

15. A camera controlling method performed by a computer and comprising:
   tracking an object within a first range, the first range indicating a part of a first frame captured by a camera and the first range being narrower than the first frame;
   controlling the camera to pan or tilt to display the object in a center of a second frame which is captured by the camera after the first frame in response to that the object is shown at a first position, the first position being a position within the first range and a position different from the center of the first frame, in a case where a size of the first range is controlled to be a first size; and sending the second frame to a user equipment, wherein the size of the first range is configured to be controllable, wherein the controlling the camera to pan or tilt is executed in response to that the object is shown at a second position, in a case where the size of the first range is controlled to be a second size, the second size being larger than the first size, wherein the second position is more distant from the center of the first frame than the first position, and is a position within the controlled first range.

16. The camera controlling method according to claim 15, wherein the camera is not controlled to pan or tilt if the position of the object stays within a third range being smaller than the first range and being located at an inner side of the first range, even if the object is not displayed in a center of the first frame.

17. The camera controlling method according to claim 15, wherein the camera captures a same field of view of the first frame if the position of the object stays within a third range being smaller than the first range and being located at an inner side of the first range, even if the object is not displayed in a center of the first frame.

18. The camera controlling method according to claim 15, comprising controlling the camera to pan or tilt if the position of the object within the first range is detected outside a third range, the third range being smaller than the first range and being located at an inner side of the first range.

19. The camera controlling apparatus according to claim 1, wherein the first range is controlled based on a size of a resource allocatable to image processing.

20. The camera controlling method apparatus according to claim 15, wherein the first range is controlled based on a size of a resource allocatable image processing.

* * * * *